United States Patent
Cheng et al.

(10) Patent No.: US 9,093,902 B2
(45) Date of Patent: Jul. 28, 2015

(54) SCALABLE AND REDUNDANT MINI-INVERTERS

(75) Inventors: George Shu-Xing Cheng, Folsom, CA (US); Steven L. Mulkey, Cameron Park, CA (US)

(73) Assignee: CyboEnergy, Inc., Rancho Cordova, CA (US)

(*) Notice: Subject to any disclaimer, the term of this patent is extended or adjusted under 35 U.S.C. 154(b) by 835 days.

(21) Appl. No.: 13/397,402

(22) Filed: Feb. 15, 2012

(65) Prior Publication Data
US 2012/0212065 A1 Aug. 23, 2012

Related U.S. Application Data

(60) Provisional application No. 61/442,991, filed on Feb. 15, 2011.

(51) Int. Cl.
| | |
|---|---|
| *H02J 1/00* | (2006.01) |
| *H02M 3/158* | (2006.01) |
| *H02J 3/38* | (2006.01) |
| *H02J 9/02* | (2006.01) |
| *H02M 3/335* | (2006.01) |
| *H02M 1/00* | (2007.01) |
| *H02M 1/32* | (2007.01) |

(52) U.S. Cl.
CPC ............ *H02M 3/1584* (2013.01); *H02J 3/385* (2013.01); *H02J 9/02* (2013.01); *H02M 3/33523* (2013.01); *H02M 2001/007* (2013.01); *H02M 2001/325* (2013.01); *Y02B 10/72* (2013.01); *Y02E 10/58* (2013.01); *Y10T 307/707* (2015.04)

(58) Field of Classification Search
CPC ................ H02M 3/1584; H02M 2001/007; H02M 3/33523; H02M 2001/325; H02J 9/02; H02J 3/385; Y10T 307/707; Y02E 10/58; Y02B 10/72

See application file for complete search history.

(56) References Cited

U.S. PATENT DOCUMENTS

| | | | |
|---|---|---|---|
| 5,903,116 A | 5/1999 | Geis | |
| 6,031,294 A | 2/2000 | Geis | |
| 6,055,524 A | 4/2000 | Cheng | |
| 6,192,668 B1 | 2/2001 | Mackay | |
| RE37,126 E * | 4/2001 | Peng et al. | 363/137 |
| 6,265,786 B1 | 7/2001 | Bosley | |
| 6,325,142 B1 | 12/2001 | Bosley | |
| 6,360,131 B1 | 3/2002 | Cheng | |

(Continued)

FOREIGN PATENT DOCUMENTS

JP 09275637 10/1997

OTHER PUBLICATIONS

U.S. Appl. No. 12/837,162.

(Continued)

*Primary Examiner* — Daniel Cavallari
(74) *Attorney, Agent, or Firm* — DLA Piper LLP (US)

(57) ABSTRACT

The Scalable and Redundant Mini-inverters as described in this invention include double, triple, or quadruple redundant capabilities so that the Mini-inverters can work in a harsh environment for a prolonged period of time. A number of regular, redundant, triple redundant, or quadruple redundant Mini-inverters with one, two, three, or multiple input channels in a mixed variety can easily connect to one, two, three, or multiple DC power sources such as solar PV modules, invert the DC power to AC power, and daisy chain together to generate AC power to the power grid.

18 Claims, 16 Drawing Sheets

(56) References Cited

U.S. PATENT DOCUMENTS

| | | | |
|---|---|---|---|
| 6,381,944 B2 | 5/2002 | Mackay | |
| 6,487,096 B1 | 11/2002 | Gilbreth | |
| 6,495,929 B2 | 12/2002 | Bosley | |
| 6,556,980 B1 | 4/2003 | Cheng | |
| 6,612,112 B2 | 9/2003 | Gilbreth | |
| 6,684,112 B1 | 1/2004 | Cheng | |
| 6,684,115 B1 | 1/2004 | Cheng | |
| 6,784,565 B2 | 8/2004 | Wall | |
| 6,870,279 B2 | 3/2005 | Gilbreth | |
| 6,958,550 B2 | 10/2005 | Gilbreth | |
| 6,960,840 B2 | 11/2005 | Willis | |
| 7,016,743 B1 | 3/2006 | Cheng | |
| 7,142,626 B2 | 11/2006 | Cheng | |
| 7,152,052 B2 | 12/2006 | Cheng | |
| 7,415,446 B2 | 8/2008 | Cheng | |
| 7,710,077 B2 | 5/2010 | Zeng et al. | |
| 8,102,074 B2* | 1/2012 | Hadar et al. | 307/5 |
| 8,786,133 B2 | 7/2014 | Cheng et al. | |
| 8,860,241 B2* | 10/2014 | Hadar et al. | 307/1 |
| 8,933,321 B2* | 1/2015 | Hadar et al. | 136/244 |
| 8,994,218 B2 | 3/2015 | Cheng et al. | |
| 2001/0043052 A1 | 11/2001 | Griffey et al. | |
| 2001/0052704 A1 | 12/2001 | Bosley | |
| 2002/0073713 A1 | 6/2002 | Mackay | |
| 2002/0099476 A1 | 7/2002 | Hamrin | |
| 2002/0166324 A1 | 11/2002 | Willis | |
| 2003/0007369 A1 | 1/2003 | Gilbreth et al. | |
| 2003/0111103 A1 | 6/2003 | Bower | |
| 2004/0103669 A1 | 6/2004 | Willis | |
| 2004/0119291 A1 | 6/2004 | Hamrin | |
| 2004/0135436 A1 | 7/2004 | Gilbreth | |
| 2004/0264225 A1 | 12/2004 | Bhavaraju | |
| 2007/0040532 A1 | 2/2007 | Bae et al. | |
| 2008/0050349 A1 | 2/2008 | Stewart | |
| 2008/0111517 A1 | 5/2008 | Pfeifer | |
| 2008/0283118 A1* | 11/2008 | Rotzoll et al. | 136/251 |
| 2009/0000654 A1* | 1/2009 | Rotzoll et al. | 136/244 |
| 2009/0159113 A1 | 6/2009 | Morimoto | |
| 2009/0160258 A1 | 6/2009 | Allen et al. | |
| 2010/0202177 A1 | 8/2010 | Kajouke | |
| 2010/0237703 A1 | 9/2010 | Stern | |
| 2011/0012430 A1* | 1/2011 | Cheng et al. | 307/82 |
| 2011/0231456 A1 | 9/2011 | Choi | |
| 2011/0273022 A1 | 11/2011 | Dennis | |
| 2012/0025618 A1 | 2/2012 | Erickson | |
| 2012/0104872 A1* | 5/2012 | Marroquin et al. | 307/147 |
| 2012/0138123 A1* | 6/2012 | Newdoll et al. | 136/246 |
| 2013/0002031 A1 | 1/2013 | Mulkey et al. | |
| 2014/0252862 A1 | 9/2014 | Cheng et al. | |
| 2014/0265584 A1 | 9/2014 | Cheng et al. | |
| 2014/0265595 A1 | 9/2014 | Cheng et al. | |
| 2014/0285024 A1 | 9/2014 | Cheng et al. | |

OTHER PUBLICATIONS

U.S. Appl. No. 13/537,206.
U.S. Appl. No. 13/493,622.
U.S. Appl. No. 14/299,705.
U.S. Appl. No. 13/844,484.
Rashid H. Muhammad, Power Electronics Handbook, 2007, Academic Press.
Maniktala, Sanjaya., "Switching Power Supplies A to Z," Elsevier, 2006.
International Search Report issued in PCT/US2010/042123 mailed Feb. 22, 2011.
Written Opinion issued in PCT/US2010/042123 mailed Feb. 22, 2011.
R. Jones. "The Measurement of Lumped Parameter Impedance: A Metrology Guide," University of Michigan, Jan. 1974.
International Preliminary Report on Patentability issued in PCT/US2010/042123 on Jan. 26, 2012.
International Search Report and Written Opinion issued in PCT/US2012/041923 on Jan. 17, 2013.
U.S. Appl. No. 12/837,162 electronically captured on Feb. 27, 2014.

* cited by examiner

SCALABLE AND REDUNDANT MINI-INVERTERS

This application claims priority to U.S. Provisional Application No. 61/442,991 filed on Feb. 15, 2011, which is herein incorporated by reference.

The subject of this patent relates to direct current (DC) to alternating current (AC) power inverters that invert DC power from single or multiple DC power sources to single-phase or three-phase AC power, where the DC power sources include but are not limited to photovoltaic (PV) solar modules, fuel cells, batteries, and other DC power generators. More particularly, this patent relates to a method and apparatus that can intelligently invert DC power generated by single or multiple solar modules to single-phase or three-phase AC power to feed the power grid with an excellent performance/price ratio to help lower the cost of solar power systems. In addition, this patent describes a novel design so that a power inventor can have redundant capability in its DC input channels to assure a long operating life span.

In the U.S. patent application Ser. No. 12/837,162, we described the novel smart and scalable power inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter. In this patent, we expand the invention by introducing the Scalable and Redundant Mini-inverters.

There are mainly two kinds of solar power inverters on the market: (i) Centralized Inverters, and (ii) Microinverters. In a traditional solar power system, the DC output from each solar module is combined in a DC junction box. The final DC output from the DC junction box is connected to a large centralized DC-AC power inverter to generate electricity. Using a Centralized Inverter includes the following shortcomings:

1. If the inverter fails, the entire solar power generation system shuts down;
2. The Centralized Inverter requires a large space to install, generates excessive heat and noise, and can be costly;
3. Since the performance of the entire solar power system is dictated by the performance of the weakest solar module, power production is negatively affected by non-uniformity of solar modules, sunlight variations or partial shading due to clouds, trees, dust on the panel, etc.;
4. The Maximum Power Point Tracking (MPPT) can only be applied to a system level, not to each solar module;
5. A lot of design and installation effort must be made to assure the solar modules are properly oriented in respect to each other;
6. The DC power output from each solar module has to be wired to a DC power junction box causing the wiring to be costly and labor intensive; and
7. Expensive large gauge DC power cables have to be used to connect the junction box and the Centralized Inverter to avoid excessive power loss.

A solar power Microinverter typically has a compact and moisture proof design so that it can be attached directly to a solar panel. Microinverters overcome the shortcomings of Centralized Inverters in many ways. For instance, the Maximum Power Point Tracking (MPPT) can be performed for each module so that solar power production is improved by 10% to 15%. In addition, Microinverters can sharply reduce the installation cost because no more detailed solar alignment design is required, and DC wiring to DC junction box is no longer needed.

Microinverters, however, have their own set of challenges including the following:

1. A Centralized Inverter is typically installed on a wall or on the ground out of direct sunlight. On the other hand, Microinverters are attached with the solar panels on the roof top, which is a very harsh working environment.
2. Performing the repair service for a Centralized Inverter is relatively easy. Typically, manufactures provide a 5 to 8 year product warranty. However, repairing or replacing a Microinverter requires a service person to get on top of the roof. The manufacturers are almost forced to provide a 15 to 25 year product warranty. This could be a huge liability for the Microinverter manufacturer.
3. Since the enclosure of a Microinverter must be sealed to be water proof, cooling fans cannot be used. Therefore, a Microinverter has to be designed and manufactured to generate minimal heat.
4. Since each solar panel requires one Microinverter, the per watt cost for a Microinverter based solar power system is higher than a Centralized Inverter based system. As an example, in 2010, the inverter cost in a solar power system is about $0.50 per watt for Centralized Inverters versus $0.85 per watt for Microinverters. Although a Microinverter based system has long term benefits, the higher entry cost can discourage buyers. More importantly, the solar power industry is under a lot of pressure to reduce costs since it cannot continue to rely on government incentive programs.

The Scalable and Redundant Mini-inverters introduced in this patent possess the key merits of both Centralized Inverters and Microinverters. What is more, the Mini-inverters overcome the main shortcomings of both Centralized Inverters and Microinverters with the following key features and benefits:

1. A scalable solar power Mini-inverter has multiple input channels to connect to multiple solar PV modules so that the inverter per watt cost can be sharply reduced.
2. A scalable solar power Mini-inverter can connect to multiple solar PV modules that may be different in types, sizes, and sunlight orientations.
3. The Mini-inverter can perform Maximum Power Point Tracking (MPPT) on each connected solar module to optimize power production.
4. A number of 1-channel, 2-channel, 4-channel, 5-channel, 6-channel, 8-channel, and multiple-channel Mini-inverters in a mixed variety can easily connect to 1, 2, 4, 5, 6, 8, and multiple solar modules, invert the DC power to AC power, and daisy chain together to generate a total power, which is equal to the summation of the AC power supplied by each Mini-inverter.
5. The inventive Mini-inverter also includes a double, triple, or quadruple redundant design for each input channel and its corresponding DC-DC boost converter circuit. If the active DC-DC boost converter is broken, a backup DC-DC boost converter can be automatically switched to continue the operation. This design assures that the Mini-inverter can work in a harsh environment for a prolonged period of time.

Figure 6:
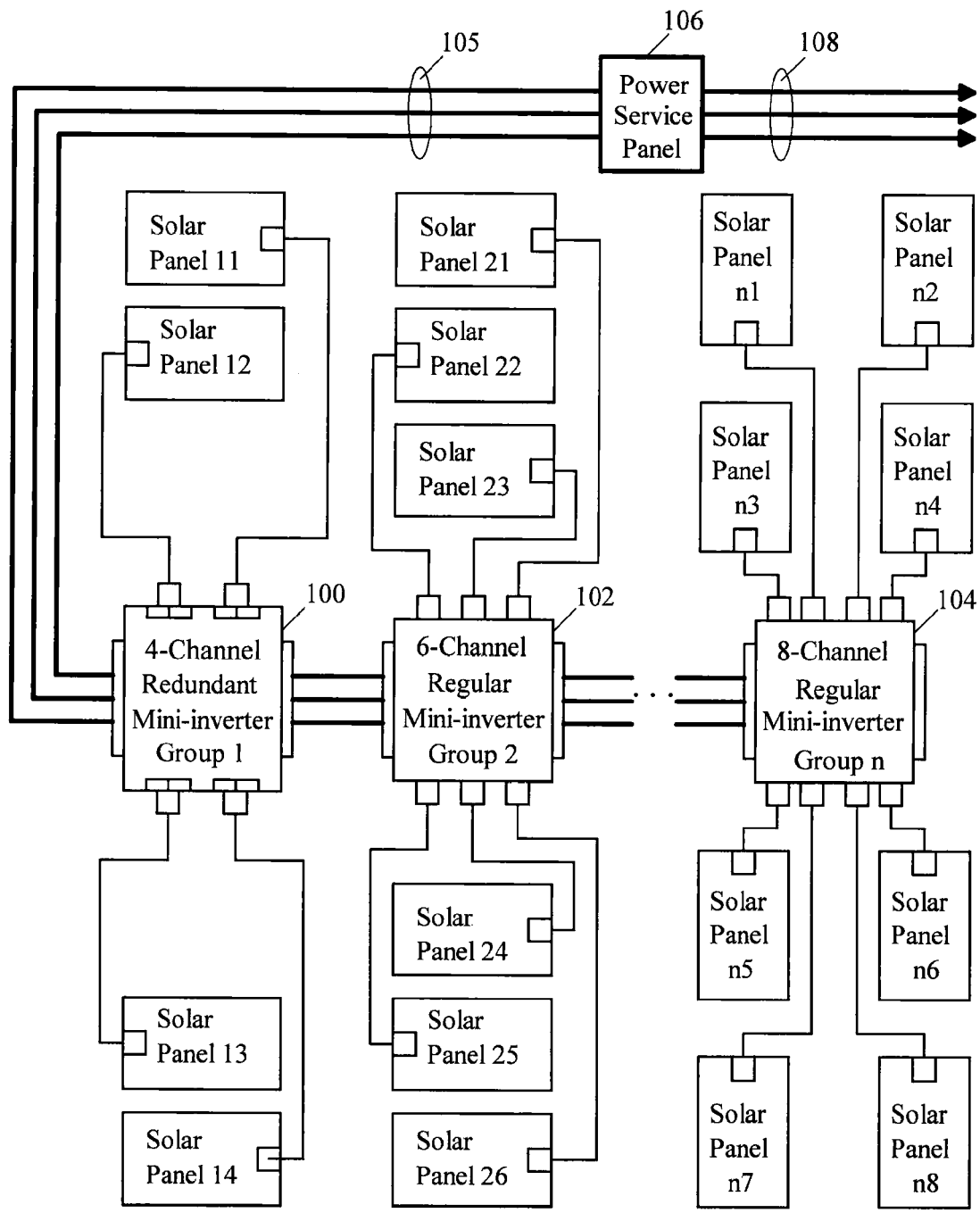

FIG. 6 is a block diagram illustrating a scalable and redundant solar power system where one 4-channel redundant Mini-inverter, one 6-channel regular Mini-inverter, one 8-channel regular Mini-inverter, and a number of Mini-inverters in a mixed variety daisy chain to generate single-phase AC power.

Figure 7:
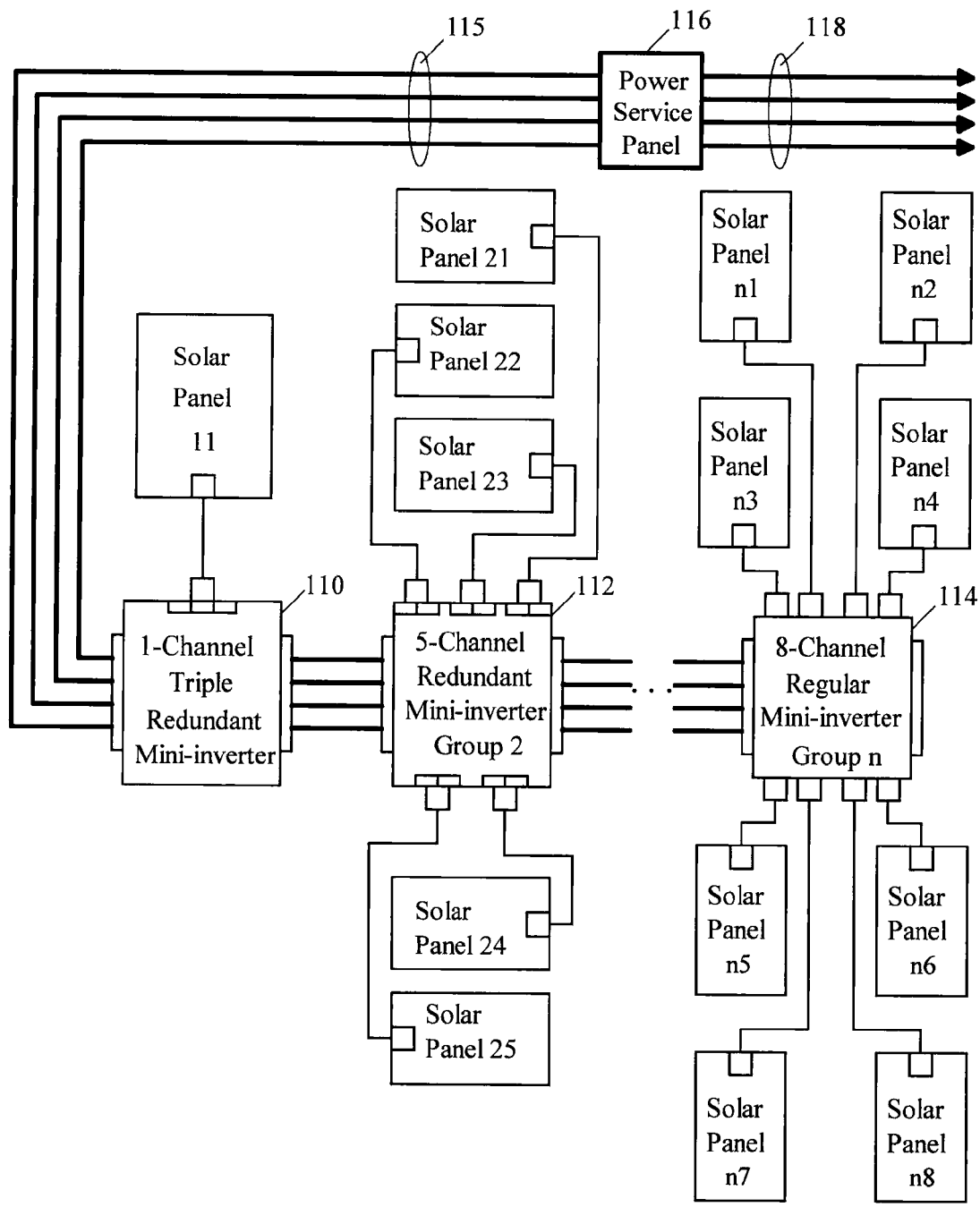

FIG. 7 is a block diagram illustrating a scalable and redundant solar power system where one 1-channel triple redundant Mini-inverter, one 5-channel redundant Mini-inverter, one 8-channel regular Mini-inverter, and a number of Mini-inverters in a mixed variety daisy chain to generate three-phase AC power.

Figure 8:
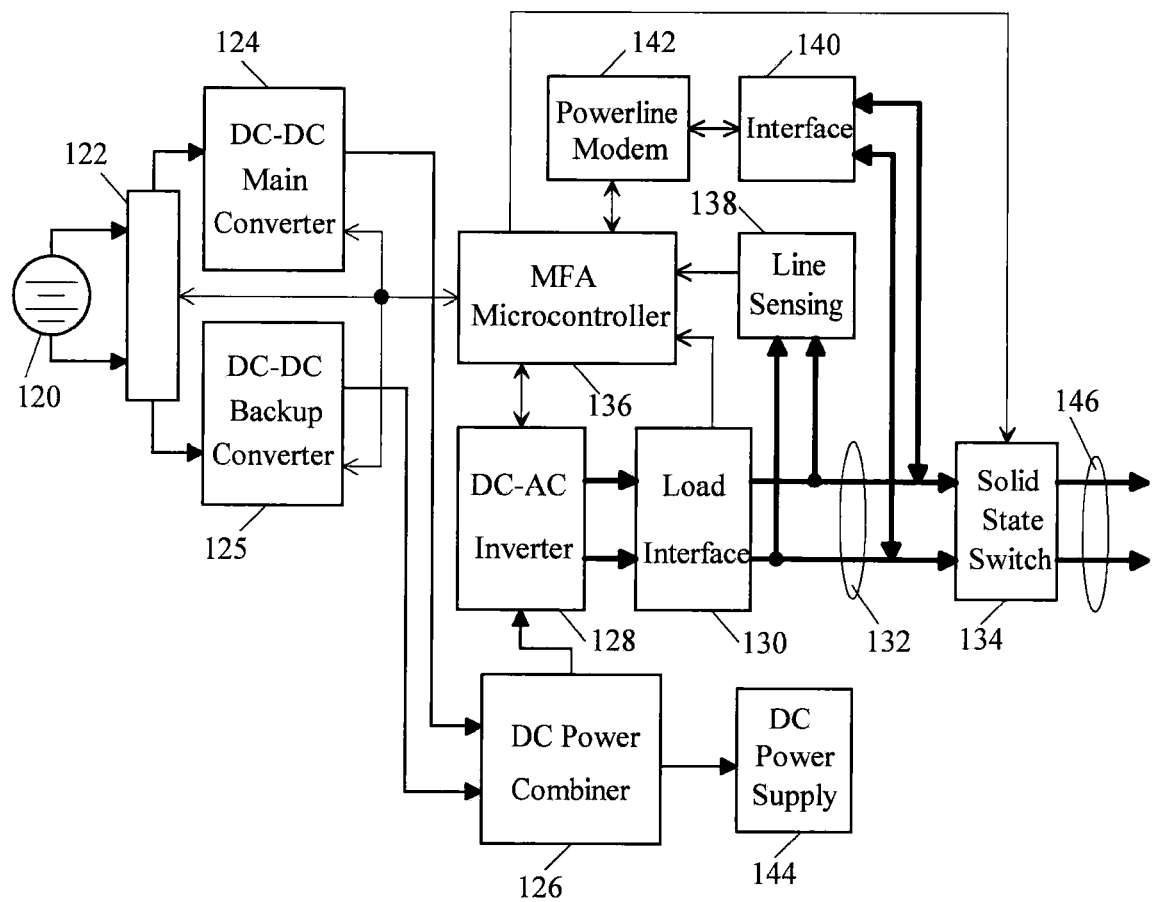

FIG. 8 is a block diagram illustrating a 1-channel redundant Mini-inverter that inverts the DC power from one DC source to single-phase AC power.

Figure 9:
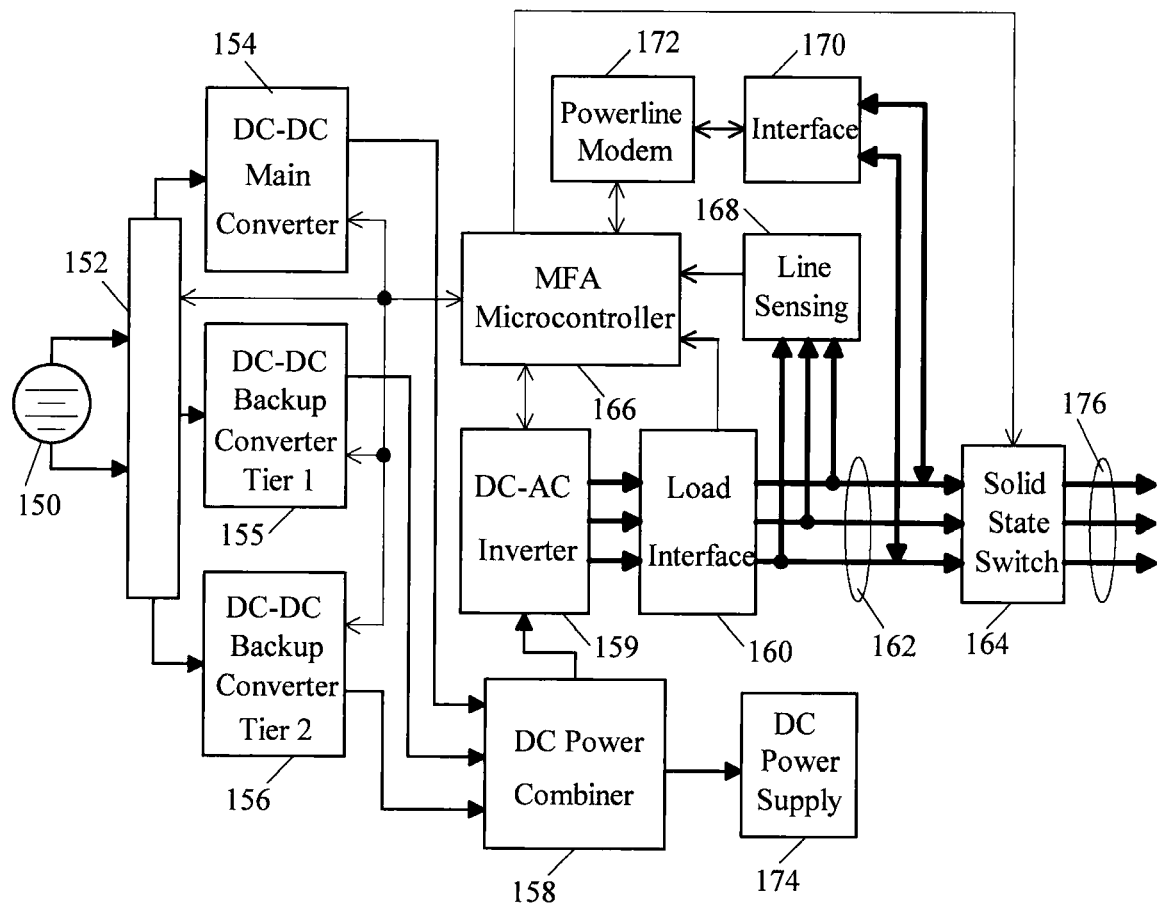

FIG. 9 is a block diagram illustrating a 1-channel triple redundant three-phase Mini-inverter that inverts the DC power from one DC source to three-phase AC power.

Figure 10:
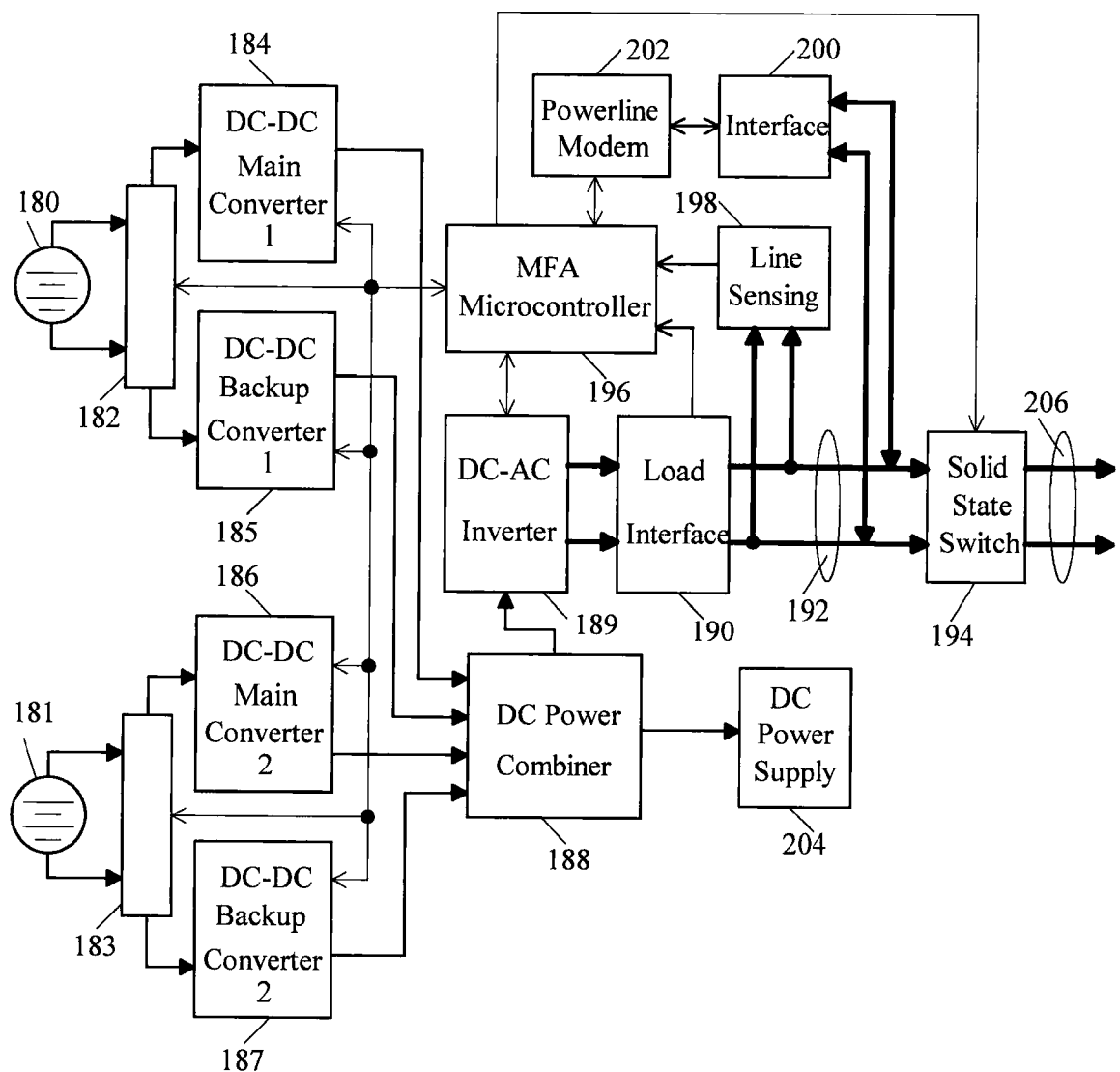

FIG. 10 is a block diagram illustrating a 2-channel redundant Mini-inverter that inverts the DC power from two DC sources to single-phase AC power.

Figure 11:
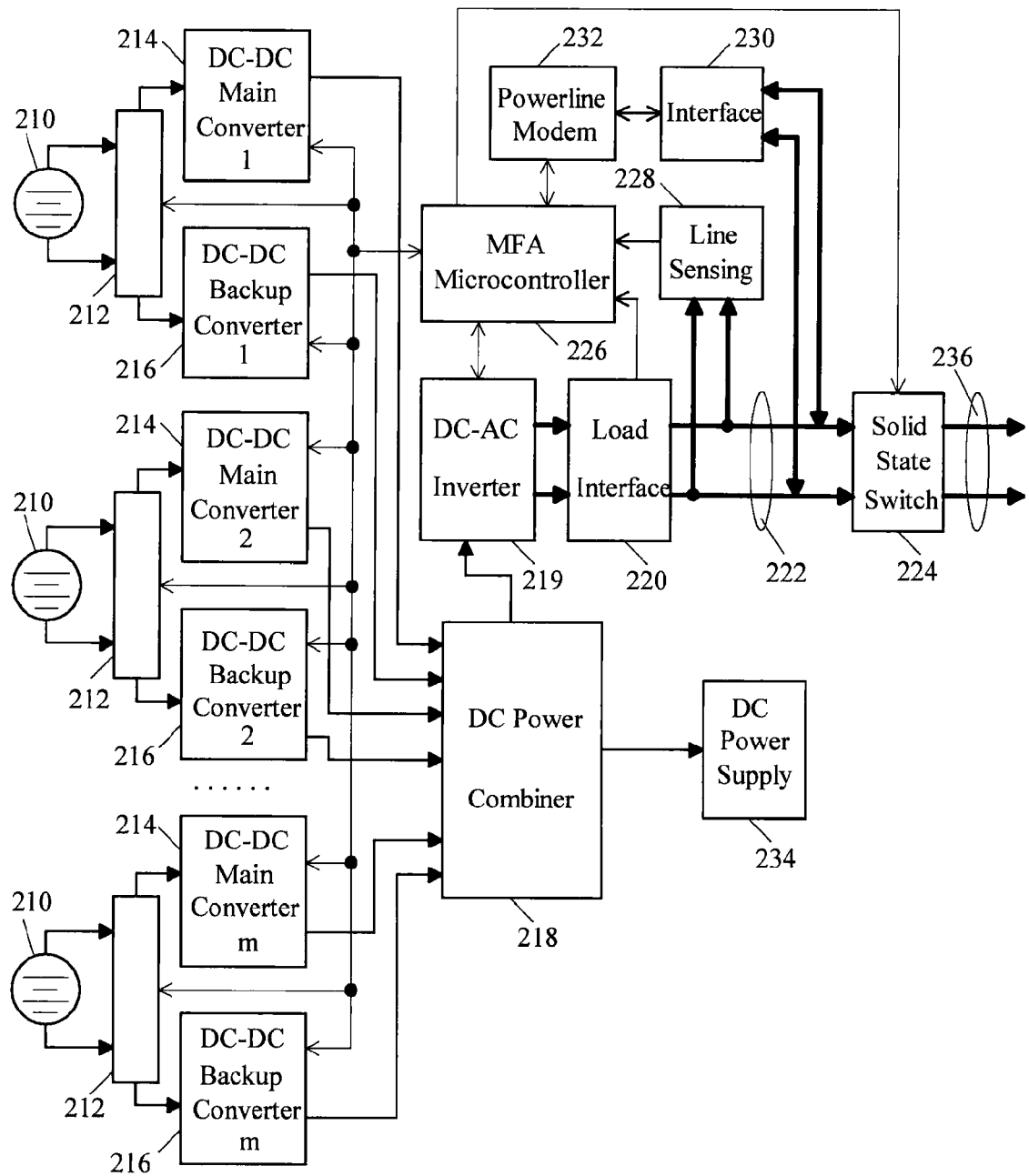

FIG. 11 is a block diagram illustrating an m-channel redundant Mini-inverter that inverts the DC power from m DC sources to single-phase AC power.

Figure 12:
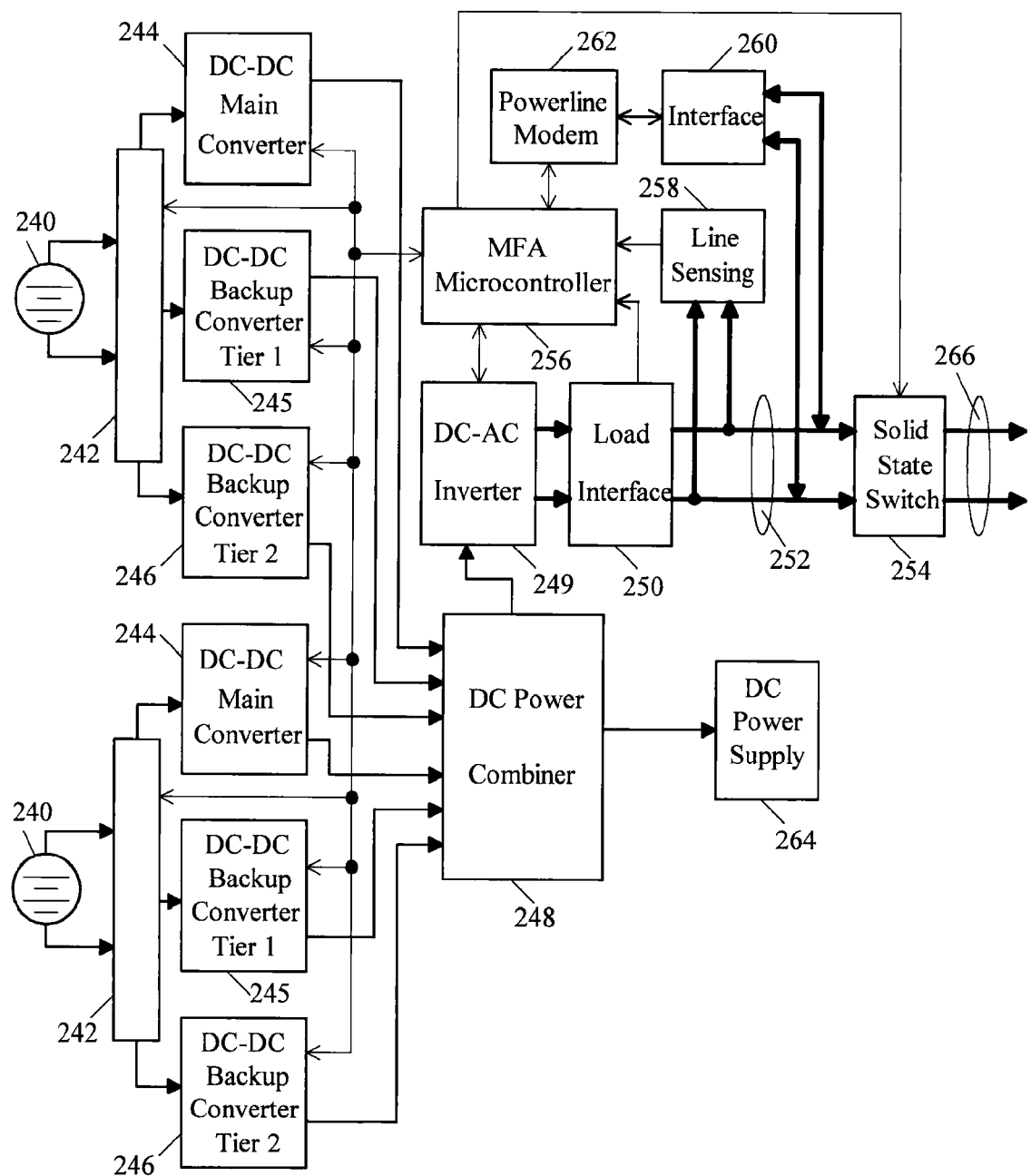

FIG. 12 is a block diagram illustrating a 2-channel triple redundant Mini-inverter that inverts the DC power from 2 DC sources to single-phase AC power.

Figure 13:
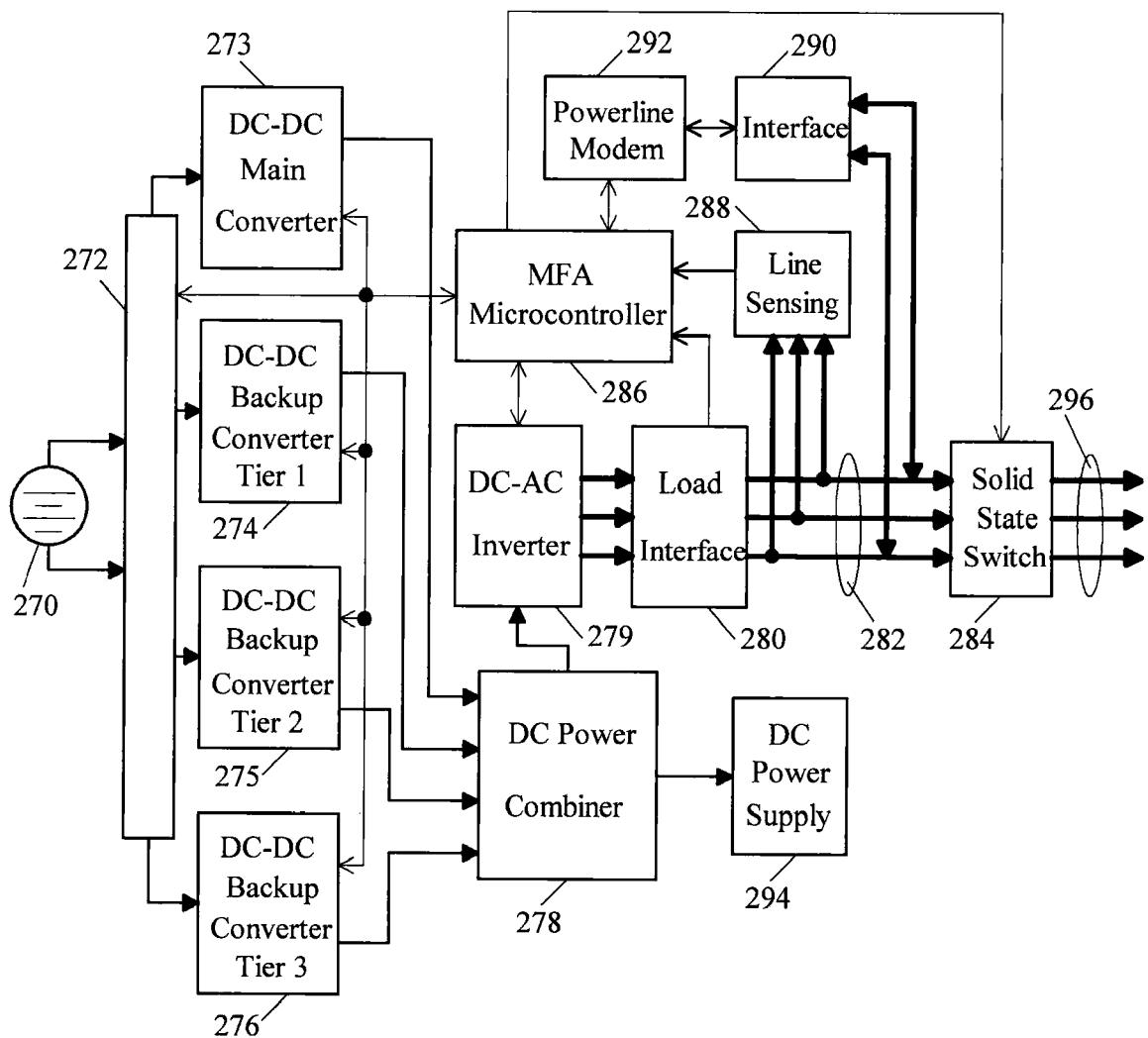

FIG. 13 is a block diagram illustrating a 1-channel quadruple redundant Mini-inverter that inverts the DC power from one DC source to three-phase AC power.

Figure 14:
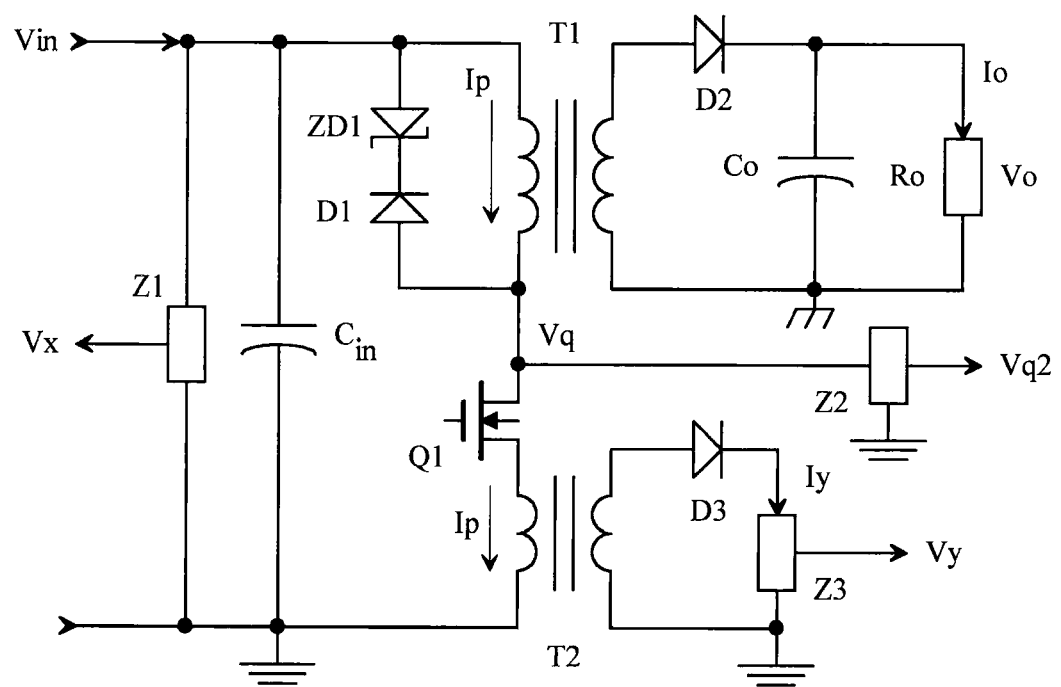

FIG. 14 is an electronic circuit diagram illustrating a Flyback converter and the sensing circuits to measure certain voltages and current to determine if the converter has failed and the redundant switch-over is needed.

Figure 15:
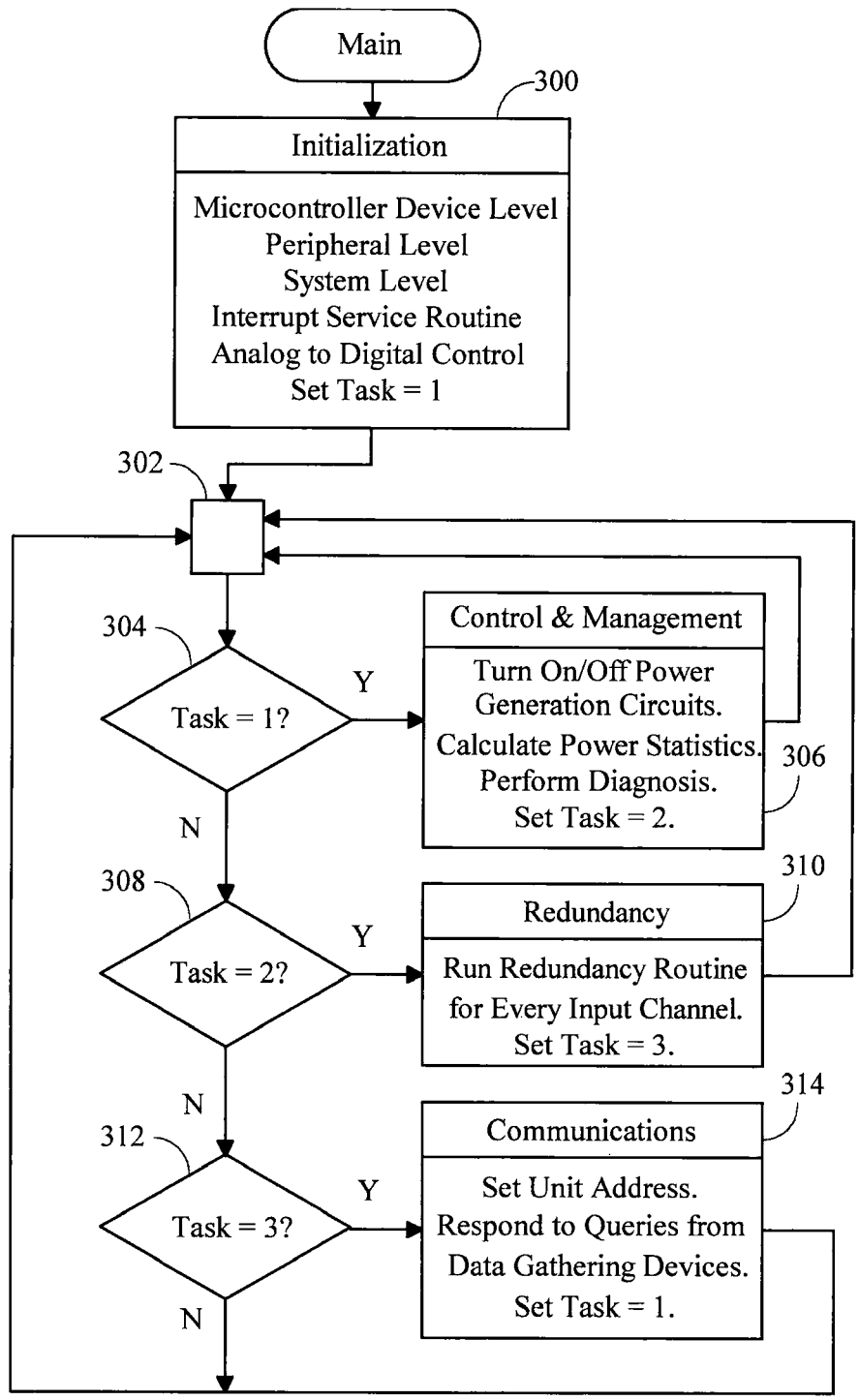

FIG. 15 is a flow chart describing the main software program running in the MFA microcontroller, which includes the redundancy task.

Figure 16:
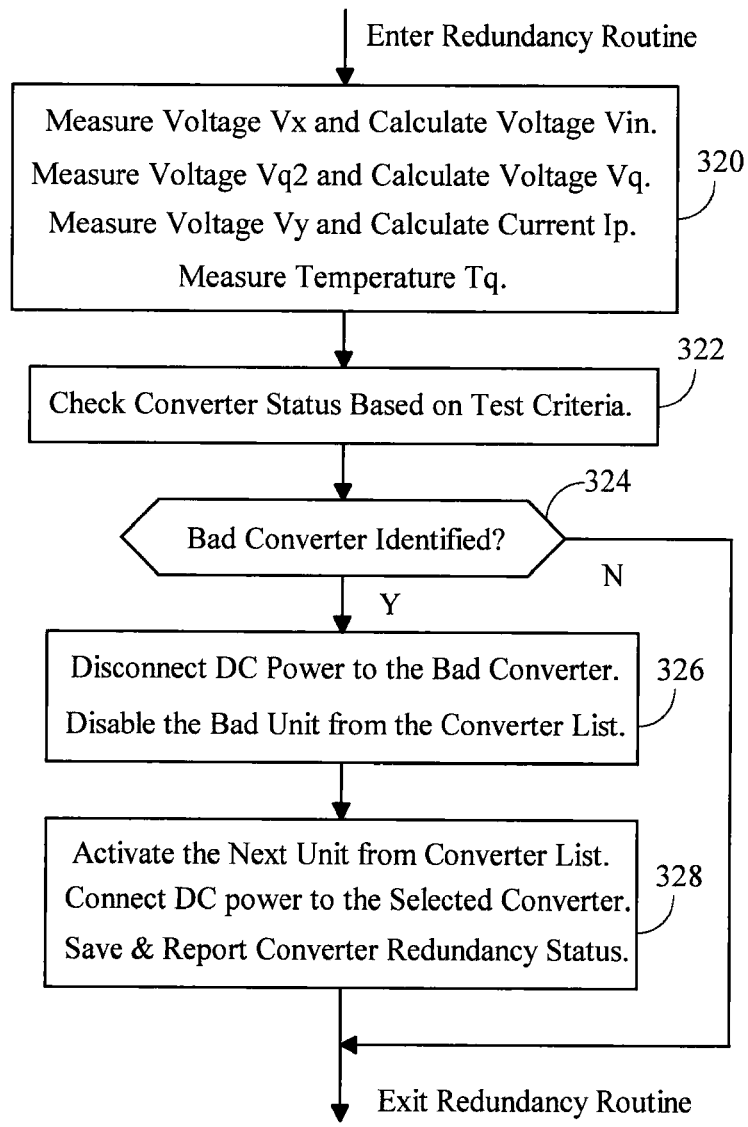

FIG. 16 is a flow chart describing the redundancy routine running in the MFA microcontroller to perform the redundancy functions for the Mini-inverters.

The term "mechanism" is used herein to represent hardware, software, or any combination thereof. The term "solar module" or "solar panel" refers to photovoltaic (PV) solar modules.

Throughout this document, $m=1, 2, 3, \ldots$, as an integer, which is used to indicate the number of the DC input ports of a Mini-inverter. The term "input channel" refers to the DC input port of the Mini-inverter. Then, an m-channel Mini-inverter means that the Mini-inverter has m input channels or m DC input ports.

Throughout this document, $n=1, 2, 3, \ldots$, as an integer, which is used to indicate the number of Mini-inverters that daisy chain in the same power inversion system.

Without losing generality, all numerical values given in this patent are examples. Other values can be used without departing from the spirit or scope of our invention.

DESCRIPTION

Figure 1:
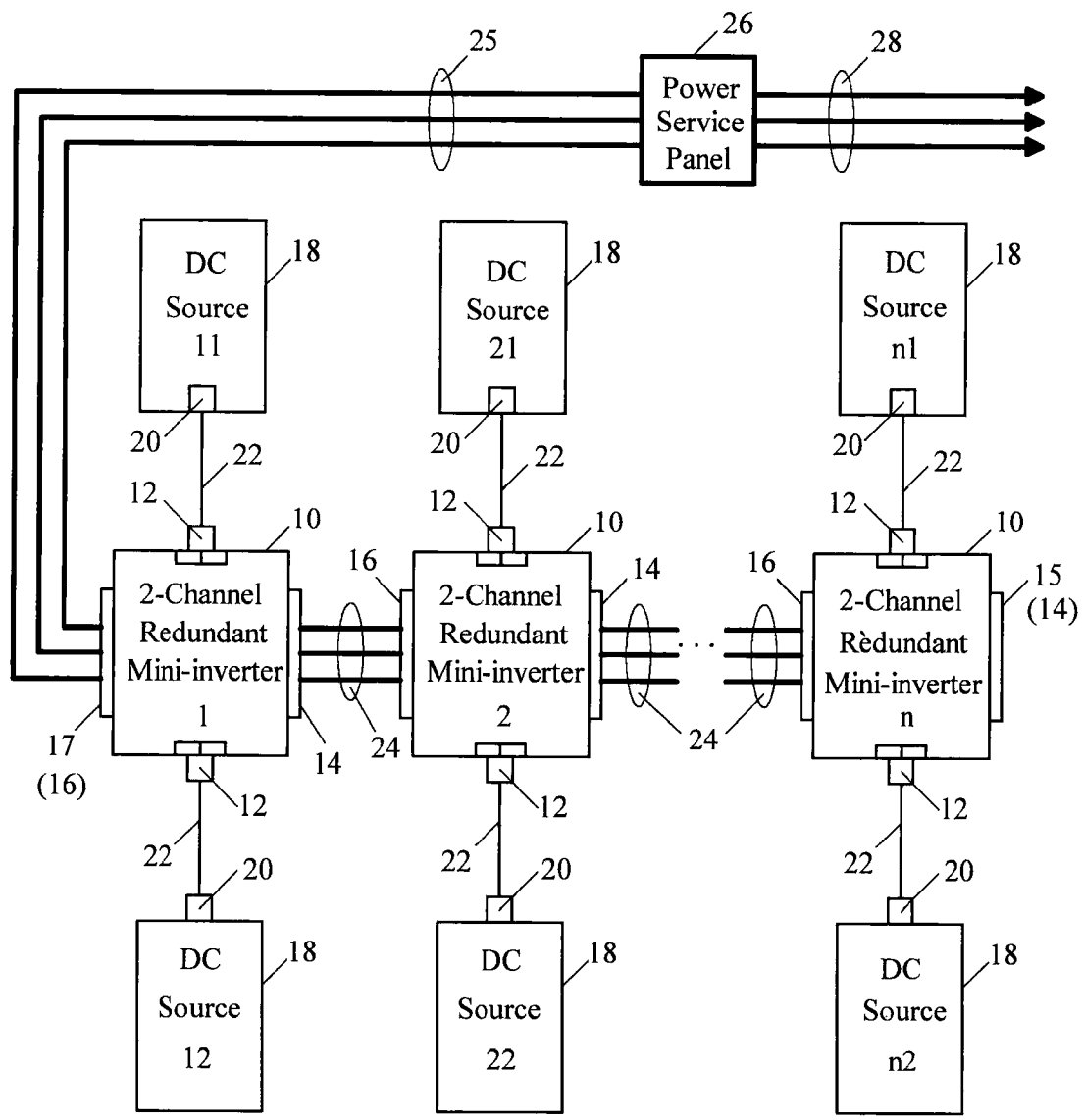
FIG. 1 is a block diagram illustrating a scalable and redundant power inversion system where two or more 2-channel redundant Mini-inverters daisy chain, each of which inverts the DC power from 2 DC sources to single-phase AC power.

FIG. 1 is a block diagram illustrating a scalable and redundant power inversion system where two or more 2-channel redundant Mini-inverters daisy chain, each of which inverts the DC power from 2 DC sources to single-phase AC power. The system comprises n 2-channel redundant Mini-inverters 10 and two times more of the DC power sources 18, so the total number of DC power sources is 2×n (2 times n). Each Mini-inverter comprises an AC power input port 14, an AC power output port 16, and two redundant DC input channels 12. Each DC power source such as a solar module comprises a DC power connector 20 connecting to a redundant DC input channel 12 of its corresponding Mini-inverter via a DC power cable 22. All Mini-inverters 10 daisy chain, where the first Mini-inverter's AC input port 15 is left open, and the last Mini-inverter's AC output port 17 is connected to a power service panel 26 via the single-phase AC powerline 25. The AC power generated by the system is supplied to the power grid 28.

Throughout this document, $n=1, 2, 3, \ldots$, as an integer. Based on the number of input channels of all the Mini-inverters in the same power inversion system, there could be a limit to the actual number of Mini-inverters that can daisy chain. This is because the total generated AC current cannot exceed the limit of the connected branch circuit breaker in the power service panel. For each power service panel, multiple branch circuits can be added based on the desired power generation requirements.

Without losing generality, let us say n=8 as an example. That means, eight 2-channel redundant Mini-inverters can daisy chain, where the AC output port of a Mini-inverter connects to the AC input port of the next Mini-inverter, and so on. The first Mini-inverter's AC input port is left open, and the last Mini-inverter's AC output port is connected to an AC power service panel so that the generated AC power can be sent to the power grid. This method greatly simplifies the wiring job when installing a PV solar power system.

Although we say the Mini-inverters daisy chain, where the AC output port of each Mini-inverter is connected to the AC input port of the next Mini-inverter, the actual connection of the inverters is pass-through. That means, the generated AC power from each Mini-inverter is added in parallel onto the AC powerline. In this scheme, a defective or low-producing Mini-inverter will not interfere with other Mini-inverters that are able to generate usable AC power. A defective or low-producing Mini-inverter will be switched off automatically by a solid-state switch mechanism in the Mini-inverter. Therefore, unless the AC powerline is broken, all the healthy Mini-inverters on the AC powerline will continue to work.

Figure 2:
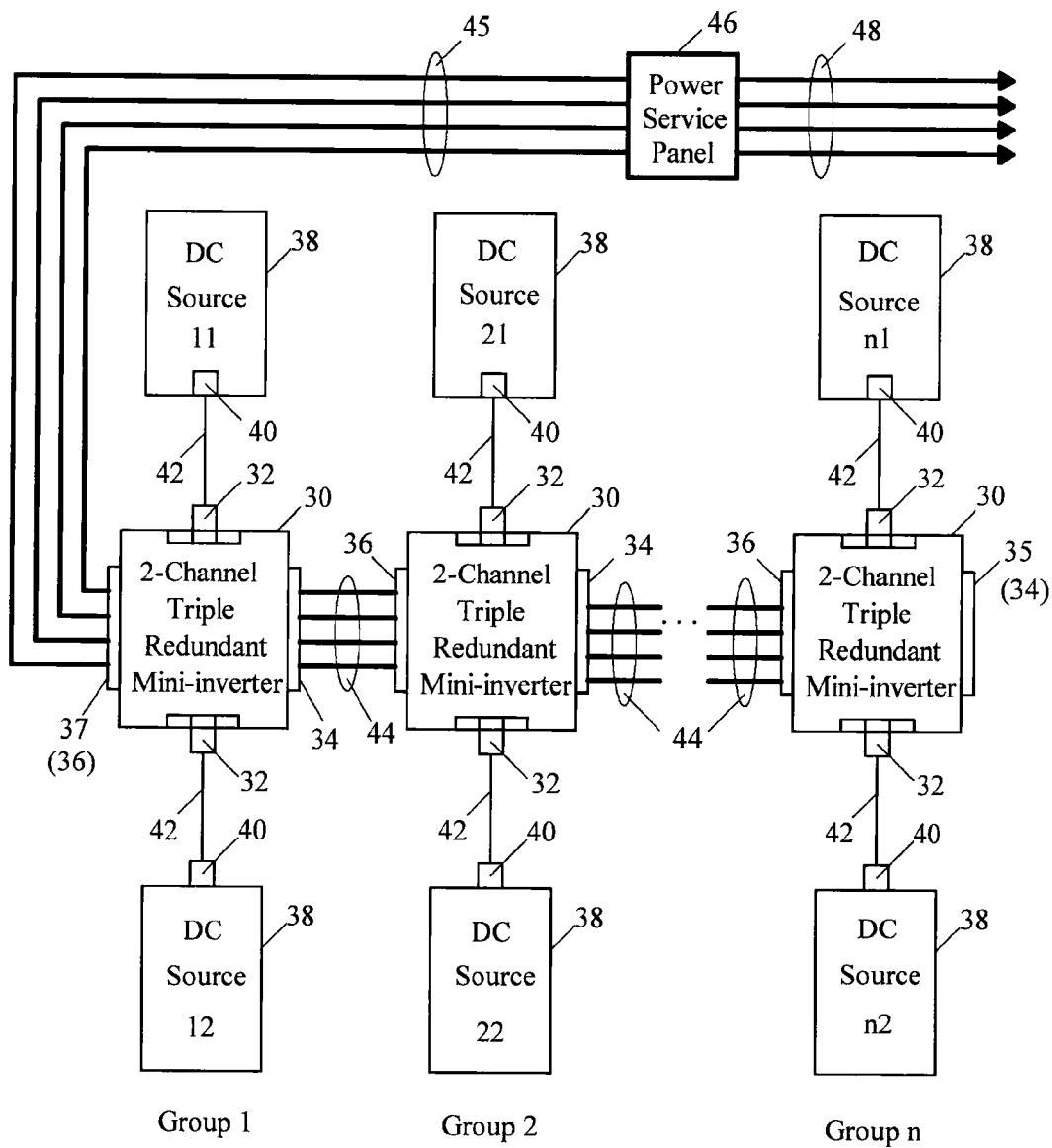
FIG. 2 is a block diagram illustrating a scalable and redundant power inversion system where two or more 2-channel triple redundant Mini-inverters daisy chain, each of which inverts the DC power from 2 DC sources to three-phase AC power.

FIG. 2 is a block diagram illustrating a scalable and redundant power inversion system where two or more 2-channel triple redundant Mini-inverters daisy chain, each of which inverts the DC power from 2 DC sources to three-phase AC power. The system comprises n 2-channel triple redundant Mini-inverters 30 and two times more of the DC power sources 38, so the total number of DC power sources is 2×n (2 times n). Each Mini-inverter comprises an AC power input port 34, an AC power output port 36, and two triple redundant DC input channels 32. Each DC power source such as a solar module comprises a DC power connector 40 connecting to a triple redundant DC input channel 32 of its corresponding Mini-inverter via a DC power cable 42. All Mini-inverters 30 daisy chain, where the first Mini-inverter's AC input port 35 is left open, and the last Mini-inverter's AC output port 37 is connected to a three-phase power service panel 46 via the three-phase AC powerline 45. The AC power generated by the system is supplied to the power grid 48.

Figure 3:
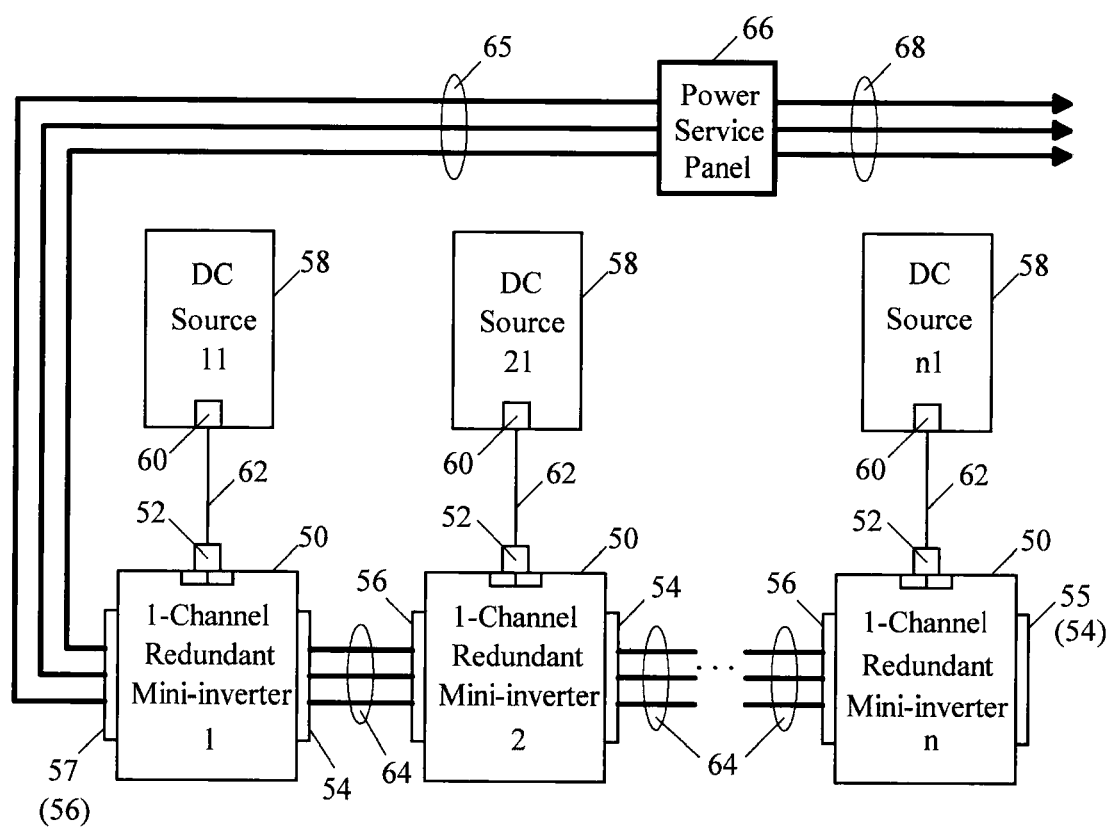
FIG. 3 is a block diagram illustrating a scalable and redundant power inversion system where two or more 1-channel redundant Mini-inverters daisy chain, each of which inverts the DC power from one DC source to single-phase AC power.

FIG. 3 is a block diagram illustrating a scalable and redundant power inversion system where two or more 1-channel redundant Mini-inverters daisy chain, each of which inverts the DC power from one DC source to single-phase AC power. The system comprises n 1-channel redundant Mini-inverters 50 and the same number of DC power sources or solar panels 58. Each Mini-inverter comprises an AC power input port 54, an AC power output port 56, and one redundant DC input channel 52. Each DC power source such as a solar panel comprises a DC power connector 60 connecting to a redundant DC input channel 52 of its corresponding Mini-inverter via a DC power cable 62. All Mini-inverters 50 daisy chain, where the first Mini-inverter's AC input port 55 is left open, and the last Mini-inverter's AC output port 57 is connected to a power service panel 66 via the single-phase AC powerline 65. The AC power generated by the system is supplied to the power grid 68.

Please note that a single channel or 1-channel Mini-inverter may look like a solar power Microinverter. However, the redundant design of Mini-inverters is novel, which will be described in FIGS. 8 to 13.

In FIGS. 4 to 7, we will use solar panels as DC sources as an example. This does not exclude other forms of DC sources such as fuel cells, batteries, etc.

Figure 4:
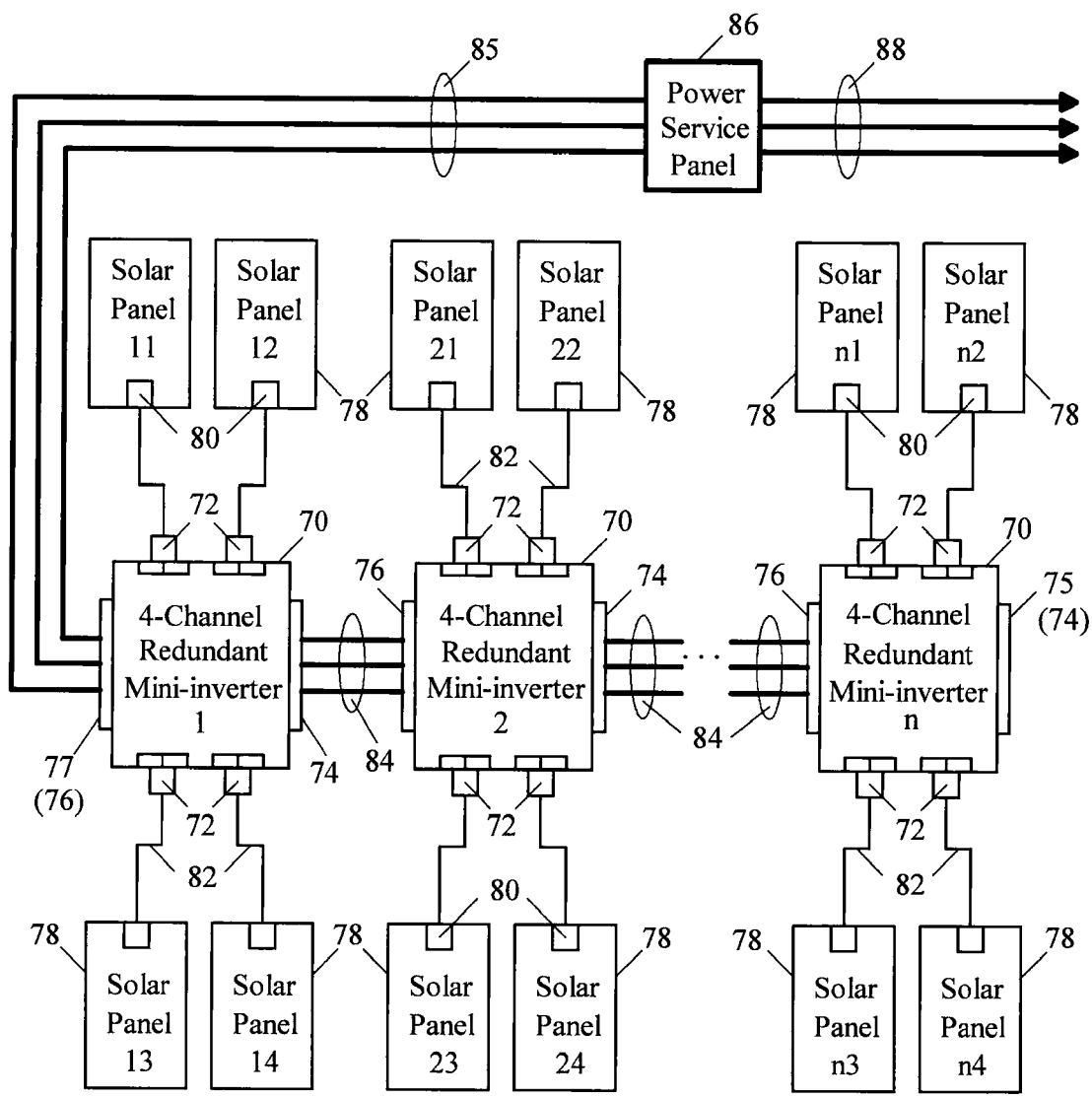
FIG. 4 is a block diagram illustrating a scalable and redundant power inversion system where two or more 4-channel redundant Mini-inverters daisy chain, each of which inverts the DC power from 4 solar panels to single-phase AC power.

FIG. 4 is a block diagram illustrating a scalable and redundant power inversion system where two or more 4-channel redundant Mini-inverters daisy chain, each of which inverts the DC power from 4 solar panels to single-phase AC power. The system comprises n 4-channel redundant Mini-inverters 70 and four times more of the DC power sources or solar panels 78, so the total number of DC power sources or solar panels is 4×n (4 times n). Each Mini-inverter comprises an AC power input port 74, an AC power output port 76, and four redundant DC input channels 72. Each DC power source such as a solar panel comprises a DC power connector 80 connecting to a redundant DC input channel 72 of its corresponding Mini-inverter via a DC power cable 82. All Mini-inverters 70 daisy chain, where the first Mini-inverter's AC input port 75 is left open, and the last Mini-inverter's AC output port 77 is connected to a power service panel 86 via the single-phase AC powerline 85. The AC power generated by the system is supplied to the power grid 88.

Figure 5:
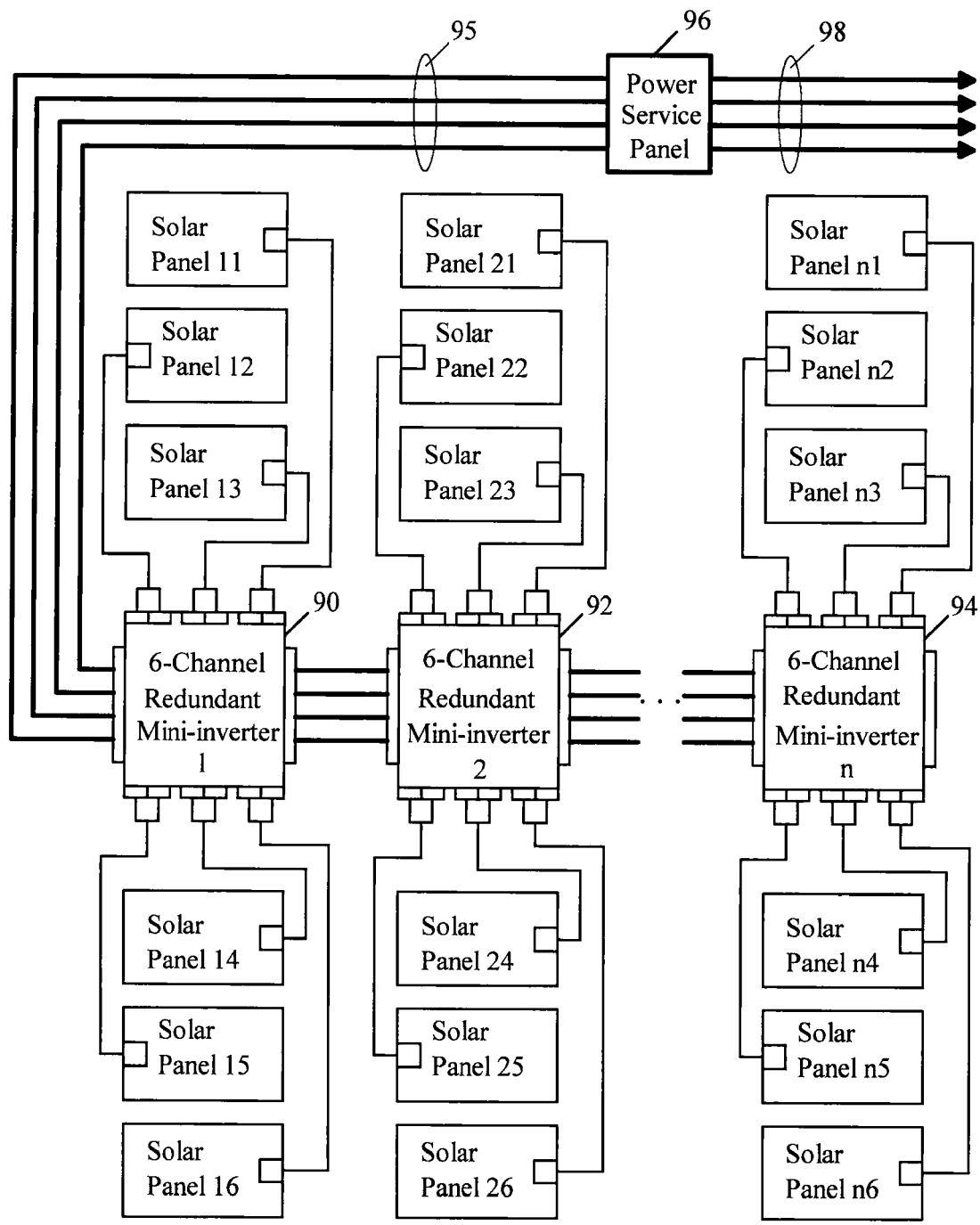
FIG. 5 is a block diagram illustrating a scalable and redundant solar power system where two or more 6-channel redundant Mini-inverters daisy chain, each of which inverts the DC power from 6 solar panels to three-phase AC power.

FIG. 5 is a block diagram illustrating a scalable and redundant solar power system where two or more 6-channel redundant Mini-inverters daisy chain, each of which inverts the DC power from 6 solar panels to three-phase AC power. The system comprises n 6-channel redundant Mini-inverters 90, 92, ..., 94 and six times more of the DC power sources or solar panels, so the total number of DC power sources or solar panels is 6×n (6 times n). Each Mini-inverter comprises an AC power input port, an AC power output port, and six redundant DC input channels. Each solar panel is connected to a redundant DC input channel of its corresponding Mini-inverter.

With a systematic approach, we will form each Mini-inverter and its connected solar panels into groups. In group 1, the 6-channel redundant Mini-inverter 90 is connected to Solar Panels 11, 12, 13, 14, 15, and 16. In group 2, the 6-channel redundant Mini-inverter 92 is connected to Solar Panels 21, 22, 23, 24, 25, and 26. In group n, the 6-channel redundant Mini-inverter 94 is connected to Solar Panels n1, n2, n3, n4, n5, and n6. There could be more groups in between Group 2 and Group n. The actual number will be based on the size of the solar power system as well as the number of the Mini-inverters that can daisy chain without violating the power service panel's power limit.

All Mini-inverters from Group 1 to Group n daisy chain, where the AC input port of the first Mini-inverter 94 is left open, and the AC output port of the last Mini-inverter 90 is connected to a three-phase power service panel 96 via the three-phase AC powerline 95. The AC power generated by the system is supplied to the power grid 98.

FIG. 6 is a block diagram illustrating a scalable and redundant solar power system where one 4-channel redundant Mini-inverter 100, one 6-channel regular Mini-inverter 102, one 8-channel regular Mini-inverter 104, and a number of Mini-inverters in a mixed variety daisy chain to generate single-phase AC power. In group 1, the 4-channel redundant Mini-inverter 100 is connected to Solar Panels 11, 12, 13, and 14. In group 2, the 6-channel regular Mini-inverter 102 is connected to Solar Panels 21, 22, 23, 24, 25, and 26. In group n, the 8-channel regular Mini-inverter 104 is connected to Solar Panels n1, n2, n3, n4, n5, n6, n7, and n8. Then, all Mini-inverters from Group 1 to Group n daisy chain, where the AC input port of the first Mini-inverter 104 is left open, and the AC output port of the last Mini-inverter 100 is connected to a power service panel 106 via the AC powerline 105. The AC power generated by the system is supplied to the power grid 108.

Please note that the regular Mini-inverters can be those smart and scalable power inverters described in U.S. patent application Ser. No. 12/837,162. They do not have the redundant design introduced in this patent. It is important to know that the regular Mini-inverters and redundant Mini-inverters can work together in a power inversion system. As described above, a mixed variety of regular Mini-inverters and redundant Mini-inverters can daisy chain through their AC input and output ports. This is a powerful and user-friendly design which provides scalability and can significantly reduce the total cost of solar power systems.

FIG. 7 is a block diagram illustrating a scalable and redundant solar power system where one 1-channel triple redundant Mini-inverter 110, one 5-channel redundant Mini-inverter 112, one 8-channel regular Mini-inverter 114, and a number of Mini-inverters in a mixed variety daisy chain to generate three-phase AC power. In group 1, the 1-channel triple redundant Mini-inverter 110 is connected to the Solar Panel 11. In group 2, the 5-channel redundant Mini-inverter 112 is connected to Solar Panels 21, 22, 23, 24, and 25. In group n, the 8-channel regular Mini-inverter 104 is connected to Solar Panels n1, n2, n3, n4, n5, n6, n7, and n8. Then, all Mini-inverters from Group 1 to Group n daisy chain, where the AC input port of the first Mini-inverter 114 is left open, and the AC output port of the last Mini-inverter 110 is connected to a three-phase power service panel 116 via the three-phase AC powerline 115. The AC power generated by the system is supplied to the power grid 118.

FIG. 8 is a block diagram illustrating a 1-channel redundant Mini-inverter that inverts the DC power from one DC source to single-phase AC power. The 1-channel redundant Mini-inverter comprises a DC input channel selector 122, a main DC-DC boost converter 124, a backup DC-DC boost converter 125, a DC power combiner 126, a DC-AC inverter 128, a load interface circuit 130, a solid-state switch circuit 134, an MFA microcontroller 136, a line sensing circuit 138, an interface circuit for powerline communications 140, a powerline communications Modem 142, and a DC power supply 144.

The MFA microcontroller 136 as well as the ones to be described in FIGS. 9, 10, 11, 12, and 13 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and application software programs. A 32-bit high-performance floating-point microcontroller is selected for this application. The MFA microcontroller performs real-time control and optimization functions for the redundant Mini-inverter, in which Model-Free Adaptive (MFA) controllers are used to control the DC-DC boost converters, and MFA optimizers provide maximum power point tracking (MPPT) to allow the Mini-inverter to achieve optimal power production. The MFA control and optimization technologies have been described in U.S. Pat. Nos. 6,055,524, 6,556,980, 6,360,131, 6,684,115, 6,684,112, 7,016,743, 7,142,626, 7,152,052, 7,415,446, related international patents, and other pending patents.

In FIG. 8, the power from a DC source 120 is delivered to either the main DC-DC boost converter 124 or the backup DC-DC boost converter 125 through the DC input channel selector 122. The DC input channel selectors used in this embodiment can be designed with a driving circuit and an analog switching device such as relay, MOSFET, IGBT, etc. Based on the command from the MFA microcontroller 136, the DC input channel selector can direct the DC power to the selected DC-DC boost converter.

A DC-DC boost converter is used to boost the DC input voltage to a higher voltage. As an example, in a solar power inversion application, a standard 200 W PV solar module will produce a usable DC power in the range of 20V to 40V DC up to 8 A. In order to produce commercial 240V AC power, the incoming DC voltage needs to be boosted to a minimal usable value such as 170V DC. Transformers, inductors, capacitors, diodes, switches, and controlled PWM (pulse width modulation) signals are used to perform the DC voltage boost in a DC-DC boost converter.

For a solar power Mini-inverter, the DC-DC boost converter needs to boost low-voltage-high-current DC power to a high-voltage-low-current DC power. A lot of current flows through the electronic components such as MOSFET switches and capacitors. In addition, heat is generated by the converter switching power circuits. Since the Mini-inverter must be sealed to be water-proof, heat dissipation is not easily accomplished. All these factors could cause the DC-DC boost converter circuit especially the MOSFET switches and capacitors to be vulnerable to stress related failures. The inventive redundant design can assure that the Mini-inverter can work in a harsh environment for a prolonged period of time.

As shown in FIG. 8, the DC power from the main DC-DC boost converter 124 and the backup DC-DC boost converter 125 is combined in the DC power combiner 126. If the main DC-DC boost converter is working, it will supply power to the DC power combiner and the backup DC-DC converter produces zero power. If it fails, the backup DC-DC boost converter will be automatically switched to supply power to the DC power combiner.

The DC power from the DC power combiner 126 is then inverted to AC power that has a voltage larger than 240VAC by the DC-AC inverter 128. The generated AC power goes through the load interface circuit 130 to be combined with the AC power in the internal AC powerline 132. The high frequency components of the generated AC power are being filtered by the load interface circuit 130. A solid-state switch 134 controlled by the MFA microcontroller 136 is used to isolate the internal AC powerline 132 from the external AC powerline 146 when solar power is not being generated. This way, consumption of AC power from the power grid by the Mini-inverter will be minimized during the non-generation time. A line sensing circuit 138 connected to the AC powerline 132 is used to detect the phase and zero-crossing point of the incoming AC power from the power grid. The phase and zero-crossing point signals are sent to the MFA microcontroller 136 for AC power synchronization to assure that the Mini-inverter provides high quality synchronized power to the grid. A powerline communications Modem 142, which is isolated by an interface circuit 140, is used to establish a 2-way digital signal communication between the MFA microcontroller 136 and the outside world through the AC powerline. This way, no extra digital signal lines are needed since the digital signals are embedded inside the AC power signal.

The DC power combiner 126 as well as the ones to be described in FIGS. 9, 10, 11, 12, and 13 provides adequate power to the DC power supply, which supplies DC power to the electronic components of the Mini-inverter.

The MFA microcontroller 136 as well as the ones to be described in FIGS. 9, 10, 11, 12, and 13 is used to perform a number of tasks including (i) monitoring the DC boost voltage, (ii) controlling the DC-DC boost converter, (iii) performing maximum power point tracking (MPPT), (iv) performing DC-AC inversion and AC power synchronization, (v) monitoring AC current and voltage for generated power amount and status, (vi) performing powerline communications, (vii) performing logic controls such as AC powerline switching and isolation, and (viii) performing redundancy functions.

FIG. 9 is a block diagram illustrating a 1-channel triple redundant three-phase Mini-inverter that inverts the DC power from one DC source to three-phase AC power. The 1-channel triple redundant Mini-inverter comprises a DC input channel selector 152, a main DC-DC boost converter 154, a first tier backup DC-DC boost converter 155, a second tier DC-DC boost converter 156, a DC power combiner 158, a DC-AC inverter 159, a load interface circuit 160, a solid-state switch circuit 164, an MFA microcontroller 166, a line sensing circuit 168, an interface circuit for powerline communications 170, a powerline communications Modem 172, and a DC power supply 174.

The power from a DC source 150 is delivered to the main converter 154 or the first tier backup converter 155 or the second tier backup converter 156 through the DC input channel selector 152. Based on the command from the MFA microcontroller 166, the DC input channel selector can direct the DC power to the selected DC-DC boost converter. The DC power from the converters 154, 155, and 156 is then combined in the DC power combiner 158. If the main converter is working, it will supply power to the DC power combiner and the backup converters produce zero power. If the main converter fails, the first tier backup converter will be automatically switched to supply power to the DC power combiner. If the first tier backup converter fails, the second tier backup converter will be automatically switched to supply power to the DC power combiner.

The DC power from the DC power combiner 158 is then inverted to three-phase AC power with voltage larger than 208VAC by the DC-AC inverter 159. The generated AC power goes through the load interface circuit 160 to be combined with the AC power in the internal three-phase AC powerline 162. A solid-state switch 164 controlled by the MFA microcontroller 166 is used to isolate the internal AC powerline 162 from the external three-phase AC powerline 176 when solar power is not being generated. A line sensing circuit 168 connected to the AC powerline 162 is used to detect the phase and zero-crossing point of the incoming AC power from the power grid. The phase and zero-crossing point signals are sent to the MFA microcontroller 166 for AC power synchronization to assure that the Mini-inverter provides high quality synchronized three-phase power to the grid. A powerline communications Modem 172, which is isolated by an interface circuit 170, is used to establish a 2-way digital signal communication between the MFA microcontroller 166 and the outside world through the AC powerline.

FIG. 10 is a block diagram illustrating a 2-channel redundant Mini-inverter that inverts the DC power from two DC sources to single-phase AC power. The 2-channel redundant Mini-inverter comprises two DC input channel selectors 182, 183, two main DC-DC boost converters 184, 186, two backup DC-DC boost converters 185, 187, a DC power combiner 188, a DC-AC inverter 189, a load interface circuit 190, a solid-state switch circuit 194, an MFA microcontroller 196, a line sensing circuit 198, an interface circuit for powerline communications 200, a powerline communications Modem 202, and a DC power supply 204.

For the first input channel, the power from the DC source 180 is delivered to either the main DC-DC boost converter 184 or the backup DC-DC boost converter 185 through the DC input channel selector 182. For the second input channel, the power from the DC source 181 is delivered to either the main DC-DC boost converter 186 or the backup DC-DC boost converter 187 through the DC input channel selector 183. Based on the command from the MFA microcontroller 196, each DC input channel selector 182, 183 can direct DC power to the selected DC-DC boost converter.

The DC power from the DC-DC boost converters 184, 185, 186, and 187 is then combined in the DC power combiner 188. For each input channel, the main DC-DC boost converter will supply power to the DC power combiner if it is working and the backup DC-DC converter produces zero power. If the main converter fails, its backup converter will be automatically switched to supply power to the DC power combiner.

The DC power from the DC power combiner 188 is then inverted to AC power with voltage larger than 240VAC by the DC-AC inverter 189. The generated AC power goes through the load interface circuit 190 to be combined with the AC power in the internal AC powerline 192. A solid-state switch 194 controlled by the MFA microcontroller 196 is used to isolate the internal AC powerline 192 from the external AC powerline 206 when solar power is not being generated. A line sensing circuit 198 connected to the AC powerline 192 is used to detect the phase and zero-crossing point of the incoming AC power from the power grid. The phase and zero-crossing point signals are sent to the MFA microcontroller 196 for AC power synchronization to assure that the Mini-inverter provides high quality synchronized power to the grid. A powerline communications Modem 202, which is isolated by an interface circuit 200, is used to establish a 2-way digital signal communication between the MFA microcontroller 196 and the outside world through the AC powerline.

FIG. 11 is a block diagram illustrating an m-channel redundant Mini-inverter that inverts the DC power from m DC sources to single-phase AC power. The m-channel redundant Mini-inverter comprises m DC input channel selectors 212, m main DC-DC boost converters 214, m backup DC-DC boost converters 216, a DC power combiner 218, a DC-AC inverter 219, a load interface circuit 220, a solid-state switch circuit 224, an MFA microcontroller 226, a line sensing circuit 228, an interface circuit for powerline communications 230, a powerline communications Modem 232, and a DC power supply 234.

For each of the m input channels, the power from the DC source 210 is delivered to either the main DC-DC boost converter 214 or the backup DC-DC boost converter 216 through the DC input channel selector 212. Based on the command from the MFA microcontroller 226, each DC input channel selector 212 can direct the DC power to the selected DC-DC boost converter. The DC power from the m main converters 214 and from the m backup converters 216 is then combined in the DC power combiner 218. For each of the m input channels, the main converter will supply power to the DC power combiner if it is working and the backup converter produces zero power. If the main converter fails, its corresponding backup converter will be automatically switched to supply power to the DC power combiner.

The DC power from the DC power combiner 218 is then inverted to AC power with voltage larger than 240VAC by the DC-AC inverter 219. The generated AC power goes through the load interface circuit 220 to be combined with the AC power in the internal AC powerline 222. A solid-state switch 224 controlled by the MFA microcontroller 226 is used to isolate the internal AC powerline 222 from the external AC powerline 236 when solar power is not being generated. A line sensing circuit 228 connected to the AC powerline 222 is used to detect the phase and zero-crossing point of the incoming AC power from the power grid. The phase and zero-crossing point signals are sent to the MFA microcontroller 226 for AC power synchronization to assure that the Mini-inverter provides high quality synchronized power to the grid. A powerline communications Modem 232, which is isolated by an interface circuit 230, is used to establish a 2-way digital signal communication between the MFA microcontroller 226 and the outside world through the AC powerline.

FIG. 12 is a block diagram illustrating a 2-channel triple redundant Mini-inverter that inverts the DC power from 2 DC sources to single-phase AC power. The 2-channel triple redundant Mini-inverter comprises 2 DC input channel selectors 242, 2 main DC-DC boost converters 244, 2 first tier backup DC-DC boost converters 245, 2 second tier backup DC-DC boost converters 246, a DC power combiner 248, a DC-AC inverter 249, a load interface circuit 250, a solid-state switch circuit 254, an MFA microcontroller 256, a line sensing circuit 258, an interface circuit for powerline communications 260, a powerline communications Modem 262, and a DC power supply 264.

For each input channel, the power from the DC source 240 is delivered to the main DC-DC boost converter 244 or the first tier backup DC-DC boost converter 245 or the second tier backup DC-DC boost converter 246 through the DC input channel selector 242. Based on the command from the MFA microcontroller 256, each DC input channel selector 242 can direct the DC power to the selected DC-DC boost converter 244, 245, or 246. The DC power from the 2 main DC-DC boost converters 244 and from the 4 backup DC-DC boost converters 245, 246 is then combined in the DC power combiner 248. For each input channel, the main converter will supply power to the DC power combiner if it is working and its backup converters produce zero power. If the main converter fails, the first tier backup converter will be automatically switched to supply power to the DC power combiner. If that fails, the second tier backup converter will be automatically switched to supply power to the DC power combiner.

The DC power from the DC power combiner 248 is then inverted to AC power with voltage larger than 240VAC by the DC-AC inverter 249. The generated AC power goes through the load interface circuit 250 to be combined with the AC power in the internal AC powerline 252. A solid-state switch 254 controlled by the MFA microcontroller 256 is used to isolate the internal AC powerline 252 from the external AC powerline 266 when solar power is not being generated. A line sensing circuit 258 connected to the AC powerline 252 is used to detect the phase and zero-crossing point of the incoming AC power from the power grid. The phase and zero-crossing point signals are sent to the MFA microcontroller 256 for AC power synchronization to assure that the Mini-inverter provides high quality synchronized power to the grid. A powerline communications Modem 262, which is isolated by an interface circuit 260, is used to establish a 2-way digital signal communication between the MFA microcontroller 256 and the outside world through the AC powerline.

FIG. 13 is a block diagram illustrating a 1-channel quadruple redundant three-phase Mini-inverter that inverts the DC power from one DC source to three-phase AC power. The 1-channel quadruple redundant Mini-inverter comprises a DC input channel selector 272, a main DC-DC boost converter 273, a first tier backup converter 274, a second tier backup converter 275, a third tier backup converter 276, a DC power combiner 278, a DC-AC inverter 279, a load interface circuit 280, a solid-state switch circuit 284, an MFA microcontroller 286, a line sensing circuit 288, an interface circuit for powerline communications 290, a powerline communications Modem 292, and a DC power supply 294.

The power from the DC source 270 is delivered to either the main DC-DC boost converter 273 or to one of the three backup DC-DC boost converters 274, 275, 276 through the DC input channel selector 272. Based on the command from the MFA microcontroller 286, the DC input channel selector can direct the DC power to the selected DC-DC boost converter. The DC power from the DC-DC boost converters 273, 274, 275, and 276 is then combined in the DC power combiner 278. The main DC-DC boost converter will supply power to the DC power combiner if it is working and its backup DC-DC converters produce zero power. If the main converter fails, the first tier backup converter will be automatically switched to supply power to the DC power combiner. If first tier backup converter fails, the second tier backup converter will be automatically switched to supply power to the DC power combiner. If the second tier backup fails, the third tier backup converter will be automatically switched to supply power to the DC power combiner.

The DC power from the DC power combiner 278 is then inverted to three-phase AC power with voltage larger than 208VAC by the DC-AC inverter 279. The generated AC power goes through the load interface circuit 280 to be combined with the AC power in the internal three-phase AC powerline 282. A solid-state switch 284 controlled by the MFA microcontroller 286 is used to isolate the internal AC powerline 282 from the external three-phase AC powerline 296 when solar power is not being generated. A line sensing circuit 288 connected to the AC powerline 282 is used to detect the phase and zero-crossing point of the incoming AC power from the power grid. The phase and zero-crossing point signals are sent to the MFA microcontroller 286 for AC power synchronization to assure that the Mini-inverter provides high quality synchronized three-phase power to the grid. A powerline communications Modem 292, which is isolated by an interface circuit 290, is used to establish a 2-way digital signal communication between the MFA microcontroller 286 and the outside world through the AC powerline.

The DC-DC boost converters that can be used in this embodiment are any of a number of well known converters described in the "Power Electronics Handbook" edited by Muhammad H. Rashid, published by Academic Press in 2007, including Buck Converter, Boost Converter, Buck-Boost Converter, Flyback Converter, Super-Lift Luo Converter, and Cascade Boost Converter. The DC input channel selectors used in this embodiment can be designed with a driving circuit and an analog switching device such as relay, MOSFET, IGBT, etc. The DC-AC inverters that can be used in this embodiment are any of a number of well known DC-AC inverters described in the same book including Half-Bridge Inverter, Full-Bridge Inverter, Bipolar PWM Inverter, Unipolar PWM Inverter, and Sinusoidal PWM Inverter. The DC combiners used in this embodiment can be designed with a circuit that allow the output from all DC-DC boost converters to connect in parallel so that all DC currents will be added together. The Powerline Modem that can be used in this embodiment can be any of a number of commercially available integrated circuits capable of providing 2-way digital communications through a powerline. Other modules discussed in this embodiment including load interface, solid state switch, line sensing circuit, powerline interface circuit, and DC power supply can be implemented using one or more known combinations of conventional electronic components such as resisters, capacitors, inductors, solid-state switches, transformers, diodes, transistors, operational amplifiers, and ceramic filters, etc.

FIG. 14 is an electronic circuit diagram illustrating a Flyback converter and the sensing circuits to measure certain voltages and current to determine if the converter has failed and the redundant switch-over is needed. The DC-DC boost converters that can be used in this embodiment are any of a number of well known converters including Buck Converter, Boost Converter, Buck-Boost Converter, Flyback Converter, Super-Lift Luo Converter, and Cascade Boost Converter. Here, we will use a Flyback converter as an example to describe how to determine the status of a DC-DC boost converter for a redundant switch-over.

As described in Sanjaya Maniktala's book, "Switching Power Supplies A to Z" published by Elsevier Inc., in 2006, a Flyback converter can be designed to include an input capacitor Cin, a transformer T1, a MOSFET Q1, a Zener ZD1, two diodes D1 and D2, an output capacitor Co, and a load resister Ro. The input capacitor Cin stores energy and filters the input voltage Vin. The transformer T1 is switched on and off by the MOSFET Q1. The Zener ZD1 and diode D1 are used to clamp and damp the voltage across the transformer T1. When the MOSFET Q1 turns on, the current through the primary winding of the transformer T1 ramps up building a magnetic field until Q1 shuts off. At that time, the magnetic field collapses inducing a higher voltage across the secondary winding of the transformer T1. The induced current is rectified by the diode D2, filtered by the output capacitor Co, and delivered to the load Ro. The output voltage is related to the windings of the transformer and can also be controlled by varying the duty cycle of the PWM control signal applied to the MOSFET Q1.

As illustrated in FIG. 14, through voltage divider Z1, we can measure voltage Vx and calculate the converter input voltage Vin. Through voltage divider Z2, we can measure voltage Vq2 and calculate Vq, which is the voltage across MOSFET Q1. Transformer T2 is used to sense the current Ip going through the primary winding of T1. When Q1 is on, current Ip flows through transformers T1 and T2. Through voltage divider Z3, we can measure voltage Vy and calculate current Iy. Using Iy, we can further calculate current Ip, which is a representation of the converter input current when Q1 is on. A temperature measurement IC is used to measure the temperature around the MOSFET Q1.

A Mini-inverter has several operating conditions including Startup Mode, Day Mode, Night Mode, and Error Mode. When sufficient power is generated by the solar modules, the Mini-inverter will go through a Startup Mode and then enter the Day Mode. A redundancy routine running inside the MFA microcontroller is activated and runs at a pre-determined time interval such as every 5 seconds. The redundancy routine will be described in FIG. 16.

The redundant switch-over is based on whether the converter is failing or has failed. Variables including Vin, Vq, Ip, and Tq can be used to determine the working status of each active DC-DC boost converter based on the test criteria listed in Table 1. Please note that these criteria are only examples.

TABLE 1

| Symbol | Variable | Test Criteria |
| --- | --- | --- |
| Vin | Converter Input Voltage. | Vin is within 20 V to 40 V limits. |
| Vq | Voltage Across MOSFET Q1. | Vq is within 0 to 150 V limits and is a moving signal. |
| Ip | Current of Primary Winding of Transformer T1. | Ip is within 0 to 15 A limits and is a moving signal. |
| Tq | Temperature Around MOSFET Q1 | Tq is below 75 degree C. |

FIG. 15 is a flow chart describing the main software program running in the MFA microcontroller, which includes the redundancy task. At Block 300, initialization is taking place in the microcontroller device level, peripheral level, system level, and for the interrupt service routine and analog and digital control routines. More specifically, initialization will include but is not limited to setting up registers, I/Os, and timers and enabling interrupts for the interrupt service routine. At the end, it will set Task=1.

In the main program, there are three major tasks. Task 1 is related to the control and management of the Mini-inverter. Task 2 is related to the redundancy of the Mini-inverter. Task 3 is related to the communications of the Mini-inverter to the outside world through the powerline Modem. After initialization, the main program enters the main loop entry point 302 and then goes to Block 304.

At Block 304, the program checks to see if Task 1 is scheduled to run. If the answer is Yes, the program will execute the functions in Block 306 to (i) turn on/off the power generation circuit based on the conditions of the DC power source(s), the Mini-inverter, and the AC powerline, (ii) calculate power statistics such as the amount of power generated during a certain period of time, and (iii) perform system diagnosis. Then, it sets Task=2 and returns to Block 302, which is the entry of the main loop.

When the program continues, it will go through Block 304, and reach Block 308. At Block 308, the program checks to see if Task 2 is scheduled to run. If the answer is Yes, the program will execute the functions in Block 310 to run the redundancy routine for each input channel that the Mini-inverter has. Then, it sets Task=3 and returns to Block 302.

When the program further continues, it will go through Block 304 and 308, and reach Block 312. At Block 312, the program checks to see if Task 3 is scheduled to run. If the answer is Yes, the program will execute the functions in Block 314 to (i) set the unit address for the Mini-inverter, and (ii) respond to queries from data gathering or acquisition devices to report the power statistics. Then, it sets Task=1 and returns to Block 302. The main program runs continuously based on a preset loop rate to execute the scheduled tasks. At any time an interrupt is triggered, the microcontroller immediately processes the pending interrupt service routine.

The key components, functions, and steps in the interrupt service routine embedded in the MFA microcontroller is described in the U.S. patent application Ser. No. 12/837,162.

FIG. 16 is a flow chart describing the redundancy routine running in the MFA microcontroller to perform the redundancy functions for the Mini-inverters. Without losing generality, the Flyback converter and the sensing circuits described in FIG. 14 as well as the variables and test criteria listed in Table 1 are used to show how the redundancy routine works.

Although there are multiple DC-DC boost converters including the main converter and backup converter(s) for each input channel, there is always only one active converter working. So the redundancy routine always checks the active converter. In addition, a redundant Mini-inverter may have multiple input channels, the redundancy routine is executed for every input channel.

At Block 320, the redundancy routine measures voltage Vx, Vq2, Vy and calculates voltage Vin, Vq, and current Ip. It also measures temperature Tq.

At Block 322, the routine tests the converter based on the test criteria as specified in Table 1 as an example.

At Block 324, the routine checks to see if the converter is found to be bad. If the answer is No, the routine will go to the end and exit. If the answer is Yes, the routine will proceed to Block 326.

At Block 326, the routine disconnects DC power to the bad converter by sending proper commands to the Input Channel Selector. It then disables the bad unit from a Converter List saved in a database. In other words, the bad converter will show a disabled status on the Converter List and will not be used again.

At Block 328, the routine activates the next available backup converter from the Converter List. It then connects DC power to the selected converter by sending proper commands to the Input Channel Selector. At last, the routine saves and reports the converter redundancy status.

The execution of the redundancy routine and its functions takes a small fraction of a second. If a redundant switch-over is taking place, there will be a reduction of produced power momentarily for a multiple channel redundant Mini-inverter. For a single channel redundant Mini-inverter, there will be no power generation from the Mini-inverter momentarily. In any case, the DC power supply to power the electronics will not be affected.

The invention claimed is:

1. A system for providing AC power to a power grid from a plurality of individual DC power sources each having a DC power output port, comprising:
   a) a plurality of power inverters, each of said power inverters being connected to one DC power source, and having an AC power input port and an AC power output port;
   b) said AC power output port of each inverter being connected in a daisy chain to the AC power input port of the next inverter, except for the AC power input port of the first inverter being left open, and the AC power output port of the last inverter being connected to a power service panel of the power grid;
   c) each of said power inverters including:
      i) a main DC-DC boost converter arranged to convert the voltage of said DC power source to a higher DC voltage suitable for inversion;
      ii) a backup DC-DC boost converter arranged to convert the voltage of said DC power source to a higher DC voltage suitable for inversion;

iii) a DC input channel selector constructed and arranged to connect the main DC-DC boost converter to said DC power source when the main DC-DC boost converter is working and connect the backup DC-DC boost converter to the DC power source when the main DC-DC boost converter is not working;

iv) a DC power combiner connected to said main DC-DC boost converter and said backup DC-DC boost converter;

v) a DC-AC inverter connected to said DC power combiner and arranged to invert the DC power to AC power with voltage higher than an external AC power voltage from the power grid;

vi) an internal AC powerline that combines the generated AC power with the external AC power from the power grid;

vii) a load interface circuit connected to said DC-AC inverter and to said internal AC powerline, said load interface circuit being arranged to filter high-frequency components out of the said DC-AC inverter's AC output;

viii) an MFA microcontroller connected to said main DC-DC boost converter, backup DC-DC boost converter, DC input channel selector, DC-AC inverter, load interface circuit, line sensing circuit, and powerline Modem, said microcontroller arranged to monitor the DC boost voltage, control the DC-DC boost converters, perform maximum power point tracking (MITT), perform DC-AC inversion and AC power synchronization, monitor AC current and voltage for generated power amount and status, perform powerline communications, perform logic controls such as AC powerline switching and isolation, and perform redundancy functions;

ix) a powerline modem connected to said microcontroller and said internal AC powerline through an interface circuitry for transmitting and receiving performance data between said microcontroller and said power grid;

x) a line sensing circuit connected to said internal AC powerline and said microcontroller for detecting the phase and zero-crossing point of the incoming AC power from the power grid;

xi) a solid state switch connected to said internal AC powerline and external AC powerline, and arranged to disconnect said internal AC powerline from the AC grid during the non-generation time; and xii) a power supply connected to said DC power combiner and arranged to supply DC power to the electronic components of said power inverter.

2. A system for providing AC power to a power grid from a plurality of individual DC power sources each having a DC power output port, comprising:

a) a plurality of power inverters, each of said power inverters being connected to m DC power sources, where m is an integer greater than or equal to two, and having an AC power input port and an AC power output port;

b) said AC power output port of each inverter being connected in a daisy chain to the AC power input port of the next inverter, except for the AC power input port of the first inverter being left open, and the AC power output port of the last inverter being connected to a power service panel of the power grid;

c) each of said power inverters including:

i) m main DC-DC boost converters, each arranged to convert the voltage of a corresponding power source to a higher DC voltage suitable for inversion;

ii) m backup DC-DC boost converters, each arranged to convert the voltage of said corresponding power source to a higher DC voltage suitable for inversion;

iii) m DC input channel selectors, each constructed and arranged to connect its corresponding main DC-DC boost converter to said corresponding DC power source when the corresponding main DC-DC boost converter is working and connect the corresponding backup DC-DC boost converter to the DC power source when the corresponding main DC-DC boost converter is not working;

iv) a DC power combiner connected to said main DC-DC boost converters and said backup DC-DC boost converters;

v) a DC-AC inverter connected to said DC power combiner and arranged to invert the DC power to AC power with voltage higher than an external AC power voltage from the power grid;

vi) an internal AC powerline that combines the generated AC power with the external AC power from the power grid;

vii) a load interface circuit connected to said DC-AC inverter and to said internal AC powerline, said load interface circuit being arranged to filter high-frequency components out of the said DC-AC inverter's AC output;

viii) an MFA microcontroller connected to said main DC-DC boost converters, backup DC-DC boost converters, DC input channel selectors, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;

ix) a powerline modem connected to said microcontroller and said internal AC powerline through an interface circuitry for transmitting and receiving performance data between said microcontroller and said power grid;

x) a line sensing circuit connected to said internal AC powerline and said microcontroller for detecting the phase and zero-crossing point of the incoming AC power from the power grid;

xi) a solid state switch connected to said internal AC powerline and external AC powerline, and arranged to disconnect said internal AC powerline from the AC grid during the non-generation time; and xii) a power supply connected to said DC power combiner and arranged to supply DC power to the electronic components of said power inverter.

3. The system of claim 2, in which the output of each of said power inverters is single-phase AC or three-phase AC.

4. The system of claim 2, in which said MFA microcontroller includes Model-Free Adaptive (MFA) controllers which control the DC-DC boost converters, and MFA optimizers which provide maximum power point tracking (MPPT) to allow the power inverter to achieve optimal power production.

5. A redundant DC-to-AC power inverter, comprising:

a) one AC power output port arranged to supply AC power to the AC power grid;

b) at least one main DC-DC boost converter and a corresponding backup DC-DC boost converter arranged to convert the voltage of a DC power source to a higher DC voltage suitable for inversion;

c) for each main DC-DC boost converter and its corresponding backup DC-DC boost converter, a DC input channel selector constructed and arranged to connect the main DC-DC boost converter to said DC power source when the main DC-DC boost converter is working and connect the corresponding backup DC-DC boost converter to said DC power source when the main DC-DC boost converter is not working;

d) a DC power combiner connected to all main DC-DC boost converters and backup DC-DC boost converters;

e) a DC-AC inverter connected to said DC power combiner and arranged to invert the DC power to AC power with voltage higher than an external AC power voltage from the power grid;

f) an internal AC powerline that combines the generated AC power with the external AC power from the power grid;

g) a load interface circuit connected to said DC-AC inverter and to said internal AC powerline, said load interface circuit being arranged to filter high-frequency components out of the said DC-AC inverter's AC output;

h) an MFA microcontroller connected to said main and backup DC-DC boost converters, DC input channel selector, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;

i) a powerline modem connected to said microcontroller and said internal AC powerline through an interface circuitry for transmitting and receiving performance data between said microcontroller and said power grid;

j) a line sensing circuit connected to said internal AC powerline and said microcontroller for detecting the phase and zero-crossing point of the incoming AC power from the power grid;

k) a solid state switch connected to said internal AC powerline and external AC powerline, and arranged to disconnect said internal AC powerline from the AC grid during the non-generation time; and l) a power supply connected to said DC power combiner and arranged to supply DC power to the electronic components of said power inverter.

6. A triple-redundant DC-to-AC power inverter, comprising:

a) one AC power output port arranged to supply AC power to the AC power grid;

b) at least one main DC-DC boost converter, a corresponding first-tier backup DC-DC boost converter, and a corresponding second-tier backup DC-DC boost converter arranged to convert the voltage of a DC power source to a higher DC voltage suitable for inversion;

c) for each main DC-DC boost converter and its corresponding first-tier and second-tier backup DC-DC boost converters, a DC input channel selector constructed and arranged to connect the main DC-DC boost converter to said DC power source when the main DC-DC boost converter is working, connect the corresponding first-tier backup DC-DC boost converter to said DC power source when the main DC-DC boost converter is not working, and connect the corresponding second-tier backup DC-DC boost converter to said DC power source when the main DC-DC boost converter and the corresponding first-tier backup DC-DC boost converter are not working;

d) a DC power combiner connected to all main DC-DC boost converters and all first-tier and second-tier backup DC-DC boost converters;

e) a DC-AC inverter connected to said DC power combiner and arranged to invert the DC power to AC power with voltage higher than an external AC power voltage from the power grid;

f) an internal AC powerline that combines the generated AC power with the external AC power from the power grid;

g) a load interface circuit connected to said DC-AC inverter and to said internal AC powerline, said load interface circuit being arranged to filter high-frequency components out of the said DC-AC inverter's AC output;

h) an MFA microcontroller connected to said main and backup DC-DC boost converters, DC input channel selector, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;

i) a powerline modem connected to said microcontroller and said internal AC powerline through an interface circuitry for transmitting and receiving performance data between said microcontroller and said power grid;

j) a line sensing circuit connected to said internal AC powerline and said microcontroller for detecting the phase and zero-crossing point of the incoming AC power from the power grid;

k) a solid state switch connected to said internal AC powerline and external AC powerline, and arranged to disconnect said internal AC powerline from the AC grid during the non-generation time; and l) a power supply connected to said DC power combiner and arranged to supply DC power to the electronic components of said power inverter.

7. A quadruple-redundant DC-to-AC power inverter, comprising:

a) one AC power output port arranged to supply AC power to the AC power grid;

b) at least one main DC-DC boost converter, a corresponding first-tier backup DC-DC boost converter, a corresponding second-tier backup DC-DC boost converter, and a corresponding third-tier backup DC-DC boost converter arranged to convert the voltage of a DC power source to a higher DC voltage suitable for inversion;

c) for each main DC-DC boost converter and its corresponding first-tier, second-tier, and third-tier backup DC-DC boost converters, a DC input channel selector constructed and arranged to connect the main DC-DC boost converter to said DC power source when the main DC-DC boost converter is working; connect the corresponding first-tier backup DC-DC boost converter to said DC power source when the main DC-DC boost converter is not working; connect the corresponding second-tier backup DC-DC boost converter to said DC power source when the main DC-DC boost converter and the corresponding first-tier backup DC-DC boost converter are not working; and connect the corresponding third-tier backup DC-DC boost converter to said DC power source when the main DC-DC boost converter and the corresponding first-tier and corresponding second-tier backup DC-DC boost converters are not working;

d) a DC power combiner connected to all main DC-DC boost converters and all first-tier, second-tier and third-tier backup DC-DC boost converters;

e) a DC-AC inverter connected to said DC power combiner and arranged to invert the DC power to AC power with voltage higher than an external AC power voltage from the power grid;

f) an internal AC powerline that combines the generated AC power with the external AC power from the power grid;

g) a load interface circuit connected to said DC-AC inverter and to said internal AC powerline, said load interface circuit being arranged to filter high-frequency components out of the said DC-AC inverter's AC output;

h) an MFA microcontroller connected to said main and backup DC-DC boost converters, DC input channel selector, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;

i) a powerline modem connected to said microcontroller and said internal AC powerline through an interface circuitry for transmitting and receiving performance data between said microcontroller and said power grid;

j) a line sensing circuit connected to said internal AC powerline and said microcontroller for detecting the phase and zero-crossing point of the incoming AC power from the power grid;

k) a solid state switch connected to said internal AC powerline and external AC powerline, and arranged to disconnect said internal AC powerline from the AC grid during the non-generation time; and l) a power supply connected to said DC power combiner and arranged to supply DC power to the electronic components of said power inverter.

8. The inverter of claim 5, in which the output of said inverter is single-phase AC or three-phase AC.

9. The inverter of claim 5, in which said MFA microcontroller includes Model-Free Adaptive (MFA) controllers which control the DC-DC boost converters, and MFA optimizers which provide maximum power point tracking (MPPT) to allow the power inverter to achieve optimal power production.

10. A scalable DC to AC power inversion system for providing AC power to a power grid from a plurality of individual DC power sources each having a DC power output port, comprising:

a) a plurality of power inverters, each of said power inverters having an AC input port, an AC output port, a main DC-DC boost converter, at least one backup DC-DC boost converter, a DC input channel selector constructed and arranged to connect the main DC-DC boost converter to a DC power source when the main DC-DC boost converter is working and connect the backup DC-DC boost converter to the DC power source when the main DC-DC boost converter is not working, and a DC power combiner connected to said main DC-DC boost converter and said backup DC-DC boost converter;

b) said AC power output port of each inverter being connected in a daisy chain to the AC power input port of the next inverter, except for the AC power input port of the first inverter being left open, and the AC power output port of the last inverter being connected to a power service panel of the power grid; and c) whereby said system is incrementally scalable by adding or subtracting DC power sources and daisy-chained inverters.

11. The system of claim 10, in which the output of each of said power inverters is single-phase AC or three-phase AC.

12. The system of claim 10, wherein each of the said power inverters comprises:

a) one AC power output port arranged to supply AC power to the AC power grid;

b) at least one main DC-DC boost converter and a corresponding backup DC-DC boost converter arranged to convert the voltage of a DC power source to a higher DC voltage suitable for inversion;

c) for each main DC-DC boost converter and its corresponding backup DC-DC boost converter, a DC input channel selector constructed and arranged to connect the main DC-DC boost converter to said DC power source when the main DC-DC boost converter is working and connect the corresponding backup DC-DC boost converter to said DC power source when the main DC-DC boost converter is not working;

d) a DC power combiner connected to all main DC-DC boost converters and backup DC-DC boost converters;

e) a DC-AC inverter connected to said DC power combiner and arranged to invert the DC power to AC power with voltage higher than an external AC power voltage from the power grid;

f) an internal AC powerline that combines the generated AC power with the external AC power from the power grid;

g) a load interface circuit connected to said DC-AC inverter and to said internal AC powerline, said load interface circuit being arranged to filter high-frequency components out of the said DC-AC inverter's AC output;

h) an MFA microcontroller connected to said main and backup DC-DC boost converters, DC input channel selector, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;

i) a powerline modem connected to said microcontroller and said internal AC powerline through an interface circuitry for transmitting and receiving performance data between said microcontroller and said power grid;

j) a line sensing circuit connected to said internal AC powerline and said microcontroller for detecting the phase and zero-crossing point of the incoming AC power from the power grid;

k) a solid state switch connected to said internal AC powerline and external AC powerline, and arranged to disconnect said internal AC powerline from the AC grid during the non-generation time; and l) a power supply connected to said DC power combiner and arranged to supply DC power to the electronic components of said power inverter.

13. A method of making a DC to AC power conversion system incrementally scalable, comprising:
   a) providing a plurality of DC power sources and a plurality of DC to AC power inverters, said inverters each having an AC input port, an AC output port, a main DC-DC boost converter, at least one backup DC-DC boost converter, a DC input channel selector constructed and arranged to connect the main DC-DC boost converter to a DC power source when the main DC-DC boost converter is working and connect the backup DC-DC boost converter to the DC power source when the main DC-DC boost converter is not working, and a DC power combiner connected to said main DC-DC boost converter and said backup DC-DC boost converter;
   b) connecting at least one of said DC power sources, respectively, to at least one of said DC to AC power inverters; and
   c) producing AC power.

14. The method of claim 13, further comprising:
   a) daisy-chaining at least two of said inverters, said AC power output port of each inverter being connected in a daisy chain to the AC power input port of the next inverter, except for the AC power input port of the first inverter being left open, and the AC power output port of the last inverter being connected to a power service panel of the power grid; and
   b) producing a total AC power that is the summation of the AC power supplied by each said inverter.

15. The method of claim 13, in which the output of each of said power inverters is single-phase AC or three-phase AC.

16. The method of claim 13, wherein each of the said power inverters further comprises:
   a) one AC power output port arranged to supply AC power to the AC power grid;
   b) at least one main DC-DC boost converter and a corresponding backup DC-DC boost converter arranged to convert the voltage of a DC power source to a higher DC voltage suitable for inversion;
   c) for each main DC-DC boost converter and its corresponding backup DC-DC boost converter, a DC input channel selector constructed and arranged to connect the main DC-DC boost converter to said DC power source when the main DC-DC boost converter is working and connect the corresponding backup DC-DC boost converter to said DC power source when the main DC-DC boost converter is not working;
   d) a DC power combiner connected to all main DC-DC boost converters and backup DC-DC boost converters;
   e) a DC-AC inverter connected to said DC power combiner and arranged to invert the DC power to AC power with voltage higher than an external AC power voltage from the power grid;
   f) an internal AC powerline that combines the generated AC power with the external AC power from the power grid;
   g) a load interface circuit connected to said DC-AC inverter and to said internal AC powerline, said load interface circuit being arranged to filter high-frequency components out of the said DC-AC inverter's AC output;
   h) an MFA microcontroller connected to said main and backup DC-DC boost converters, DC input channel selector, DC-AC inverter, and load interface circuit, said microcontroller arranged to monitor the DC boost voltage, control the DC-DC boost converters, perform maximum power point tracking (MPPT), perform DC-AC inversion and AC power synchronization, monitor AC current and voltage for generated power amount and status, perform powerline communications, perform logic controls such as AC powerline switching and isolation, and perform redundancy functions;
   i) a powerline modem connected to said microcontroller and said internal AC powerline through an interface circuitry for transmitting and receiving performance data between said microcontroller and said power grid;
   j) a line sensing circuit connected to said internal AC powerline and said microcontroller for detecting the phase and zero-crossing point of the incoming AC power from the power grid;
   k) a solid state switch connected to said internal AC powerline and external AC powerline, and arranged to disconnect said internal AC powerline from the AC grid during the non-generation time; and
   l) a power supply connected to said DC power combiner and arranged to supply DC power to the electronic components of said power inverter.

17. The inverter of claim 5, in which the said MFA microcontroller is programmed with a main program to iteratively:
   a) turn on and off the inverter's generation circuit based on the DC power source input and conditions of the inverter and AC powerline;
   b) calculate the inverter's power statistics such as the amount of power generated during a certain period of time;
   c) perform diagnostics for the inverter's status and operation;
   d) run redundancy routine for every input channel;
   e) set the inverter's unit address;
   f) perform powerline communications; and
   g) respond to queries from data gathering or acquisition devices to report the power statistics.

18. The inverter of claim 5, in which said MFA microcontroller is further programmed with a redundancy routine to iteratively:
   a) monitor said DC-DC boost converter;
   b) check the status of said DC-DC boost converter based on the monitoring and a set of test criteria;
   c) if the DC-DC boost converter is found to be bad, disconnect DC power to the bad converter by sending proper commands to the input channel selector;
   d) disable the bad unit from a converter list saved in a database;
   e) activate the next available backup DC-DC boost converter from the converter list;
   f) connect DC power to the selected DC-DC boost converter by sending proper commands to the input channel selector; and
   g) save and report the DC-DC boost converter redundancy status.

* * * * *